US008703855B2

(12) United States Patent
van de Wetering et al.

(10) Patent No.: US 8,703,855 B2
(45) Date of Patent: *Apr. 22, 2014

(54) ELECTRICAL TRACKING RESISTANCE COMPOSITIONS, METHODS AND ARTICLES OF MANUFACTURE

(75) Inventors: Karin van de Wetering, Bergen op Zoom (NL); Robert D. van de Grampel, Tholen (NL); Jaykisor Pal, Bangalore (IN); Andries J. P. Van Zyl, Bergen op Zoom (NL); Paul D. Sybert, Evansville, IN (US)

(73) Assignee: SABIC Innovative Plastics IP B.V. (NL)

( * ) Notice: Subject to any disclaimer, the term of this patent is extended or adjusted under 35 U.S.C. 154(b) by 142 days.

This patent is subject to a terminal disclaimer.

(21) Appl. No.: 13/207,930

(22) Filed: Aug. 11, 2011

(65) Prior Publication Data

US 2012/0248102 A1 Oct. 4, 2012

(51) Int. Cl.
C08F 283/02 (2006.01)
(52) U.S. Cl.
USPC ........... 524/407; 525/464; 525/102; 525/101; 524/413
(58) Field of Classification Search
USPC .................. 524/407, 413; 525/464, 102, 101
See application file for complete search history.

(56) References Cited

U.S. PATENT DOCUMENTS

| | | | |
|---|---|---|---|
| 3,751,400 | A | 8/1973 | Crennan et al. |
| 3,929,908 | A | 12/1975 | Orlando et al. |
| 4,170,711 | A | 10/1979 | Orlando et al. |
| 4,404,350 | A | 9/1983 | Ryang |
| 4,443,581 | A | 4/1984 | Robeson et al. |
| 4,923,933 | A | 5/1990 | Curry |
| 5,451,632 | A | 9/1995 | Okumura et al. |
| 6,031,036 | A | 2/2000 | Rosenquist et al. |
| 6,140,399 | A | 10/2000 | Munro |
| 6,462,111 | B1 | 10/2002 | Singh et al. |
| 6,723,864 | B2 | 4/2004 | Silva et al. |
| 6,753,367 | B2 | 6/2004 | Goossens et al. |
| 6,822,041 | B2 * | 11/2004 | Schottland et al. ........... 524/588 |
| 6,833,422 | B2 | 12/2004 | Silva et al. |
| 7,652,107 | B2 | 1/2010 | Gallucci et al. |
| 7,790,292 | B2 | 9/2010 | Colborn et al. |
| 2006/0030664 | A1 | 2/2006 | Kim |
| 2007/0129492 | A1 | 6/2007 | Colborn et al. |
| 2007/0135569 | A1 * | 6/2007 | DeRudder ............... 525/67 |
| 2008/0230751 | A1 | 9/2008 | Li et al. |
| 2009/0043053 | A1 | 2/2009 | Gorny et al. |
| 2011/0098386 | A1 | 4/2011 | Krauter et al. |
| 2012/0248382 | A1 | 10/2012 | Van De Wetering et al. |
| 2012/0248384 | A1 | 10/2012 | Van De Wetering et al. |
| 2012/0267480 | A1 | 10/2012 | Sybert et al. |
| 2012/0269994 | A1 | 10/2012 | Sybert et al. |
| 2012/0273738 | A1 | 11/2012 | Sybert et al. |

FOREIGN PATENT DOCUMENTS

| | | |
|---|---|---|
| DE | 102008054329 A1 | 5/2010 |
| EP | 0524731 A1 | 1/1993 |
| EP | 0899306 B1 | 11/2004 |
| EP | 1555296 A1 | 7/2005 |
| WO | 2005037921 A1 | 4/2005 |
| WO | 2010005486 A3 | 1/2010 |

OTHER PUBLICATIONS

German Publication No. 200810054329; Publication Date: May 6, 2010; Abstract Only; 1 Page.
International Search Report for the International Application No. PCT/US2012/031132, International Filing Date Mar. 29, 2012, Date of Mailing Jun. 13, 2012, 5 pages.
Written Opinion for International Application No. PCT/US2012/031132, International Filing Date Mar. 29, 2012, Date of Mailing Jun. 13, 2012, 7 pages.
U.S. Appl. No. 13/251,137, filed Sep. 30, 2011.
U.S. Appl. No. 13/251,122, filed Sep. 30, 2011.
U.S. Appl. No. 13/251,130, filed Sep. 30, 2011.
Evonik Industries, Europlex PPSU 99470 CF130, 2010, 8 pages.
"Federal Aviation Administration Section 28.853", Federal Aviation Regulations [online], retrieved on Nov. 18, 2011 from http://www.gpo.gov/fdsys/pkg/CFR-2011-title14-vol1/pdf/CFR-2011-title14-vol1-sec25-853.pdf, 51 pages.
Federal Aviation Regulations Section 25, Appendix F, Part IV, Federal Aviation Regulations [online], retrieved on Nov. 18, 2011 from http://www.gpo.gov/fdsys/pkg/CFR-2011-title14-vol1/pdf/CFR-2011-title14-vol1-part25-appF.pdf , 51 pages.
Innes et al., "Flame retardants for polycarbonate—new and classical solutions", Plastics Additives & Compounding, Jan.-Feb. 2006:26-29.
Lexan EXL9930 Catalog, 2004, pp. 1-6.
Lexan Resin FST9705 Datasheet. Last updated Jan. 6, 2011, 2 pages.

\* cited by examiner

*Primary Examiner* — Margaret Moore
(74) *Attorney, Agent, or Firm* — Cantor Colburn LLP

(57) ABSTRACT

This disclosure relates to polycarbonate compositions, methods, and articles of manufacture that at least meets certain electrical tracking resistance requirements. The compositions, methods, and articles of manufacture that meet these requirements contain at least a polycarbonate; a polysiloxane block co-polycarbonate; and a transition metal oxide, e.g. titanium dioxide.

20 Claims, No Drawings

US 8,703,855 B2

ELECTRICAL TRACKING RESISTANCE COMPOSITIONS, METHODS AND ARTICLES OF MANUFACTURE

CROSS REFERENCE TO RELATED APPLICATIONS

This application claims priority to Indian Patent Application No. 920/DEL/2011, filed Mar. 31, 2011, and which is hereby incorporated by reference in its entirety.

FIELD OF THE INVENTION

This disclosure relates to polycarbonate compositions, methods, and articles of manufacture that at least meets certain electrical tracking resistance requirements.

BACKGROUND OF THE INVENTION

Polycarbonate (PC) and copolycarbonate resins offer many significant advantages and are utilized for a number of different commercial applications. Polycarbonates used for electrical applications require a combination of good flame retardancy as well as electrically insulating properties, such as resistance against tracking under leakage current. The char formation properties of PC, which are often enhanced by the addition of flame retardant additives, often lead to poor tracking resistance, making the combination of these properties challenging. In many cases there is also a requirement for good impact properties and in particular, impact resistance at low temperature. The use of impact modifiers may not only impair the tracking resistance, but in many cases also the flame retardancy. It is therefore all the more challenging to find a material combining flame retardancy, tracking resistance and low temperature impact resistance and combinations thereof. There accordingly remains a need in the art for products for electrical applications for a variety of materials that provide a delicate balance of tracking resistance, flame retardancy, and/or impact performance, and a combination thereof.

SUMMARY OF THE INVENTION

A. Electrical Tracking Resistance/Impact

The present disclosure provides for a composition comprising: at least one polycarbonate that is a not a polysiloxane block-co-polycarbonate; a polysiloxane block co-polycarbonate; a transition metal oxide; optionally a brominated organic flame retardant; optionally a fluorinated polyolefin; optionally one or more additives that impart a desired performance property; and optionally a carbon black containing material, wherein the composition has a notched izod impact at −30° C. of at least 35 kJ/m² at a thickness of 3.0 mm according to ISO-180 standard with a 5.5 J hammer and further wherein the composition does not show tracking through at least 50 drops of a 0.1% aqueous ammonium chloride at 250V according to ASTM D-3638.

The present disclosure further provides for a composition that comprises: at least one polycarbonate that is a not a polysiloxane block-co-polycarbonate; 5 to 45 wt % of a polysiloxane block co-polycarbonate; 3 to 40 wt % of a transitional metal oxide; optionally a brominated organic flame retardant; optionally a fluorinated polyolefin; optionally one or more additives that impart a desired performance property; and optionally a carbon black containing material, wherein the composition has a notched izod impact of at −30° C. of at least 35 kJ/m² at a thickness of 3.0 mm according to ISO-180 standard with a 5.5 J hammer and further wherein the composition does not show tracking through at least 50 drops of a 0.1% aqueous ammonium chloride solution at 250V according to ASTM D-3638.

The present disclosure further provides for a method of controlling the tracking of an electrical current of an article of manufacture containing a polycarbonate containing material comprising: providing a composition comprising at least one polycarbonate that is a not a polysiloxane block-co-polycarbonate; a polysiloxane block co-polycarbonate; a transition metal oxide; optionally a brominated organic flame retardant; optionally a fluorinated polyolefin; optionally one or more additives that impart a desired performance property; and optionally a carbon black containing material, wherein the composition has a notched izod impact at −30° C. of at least 35 kilojoules per meter squared (kJ/m²) at a thickness of 3.0 mm according to ISO-180 standard with a 5.5 J hammer and further wherein the composition does not show tracking through at least 50 drops of a 0.1% aqueous ammonium chloride at 250V according to ASTM D-3638; and processing said polycarbonate containing material to form an article of manufacture.

The present disclosure further provides for articles of manufacture that contain the polycarbonate formulations described above.

B. Electrical Tracking Resistance/FR

The present disclosure provides for a composition comprising: at least one polycarbonate that is not a polysiloxane block co-polycarbonate; a polysiloxane block co-polycarbonate; a transition metal oxide; a brominated organic flame retardant or a halogen organic flame retardant compound; optionally a fluorinated polyolefin; optionally one or more additives that impart a desired performance property; and optionally a carbon black containing material, wherein said composition has a p(FTP)V0 flammability rating of greater than 0.85 at 1.5 mm, 1.0 mm, or 0.8 mm or between 1.5 mm and 0.8 mm according to the method of UL 94, and further wherein the composition does not show tracking through at least 50 drops of a 0.1% aqueous ammonium chloride solution at 250V according to ASTM D-3638.

The present disclosure also provides for a composition comprising: at least one polycarbonate that is a not a polysiloxane block-co-polycarbonate; 5 to 45 wt % of a polysiloxane block co-polycarbonate; 3 to 40 wt % of a transitional metal oxide; 1 to 10 wt % of bromine atoms from a brominated organic flame retardant; optionally 0 to 1 wt % of a fluorinated polyolefin; optionally one or more additives that impart a desired performance property; and optionally a carbon black containing material, wherein said composition has a p(FTP) V0 flammability rating of >0.85 at 1.5 mm, 1.0 mm, or 0.8 mm or between 1.5 mm and 0.8 mm according to the method of UL 94, and further wherein the composition does not show tracking through at least 50 drops of a 0.1% aqueous ammonium chloride solution at 250V according to ASTM D-3638.

The present invention further provides for a method of controlling the tracking of an electrical current of an article of manufacture containing a polycarbonate containing material comprising: providing a composition comprising at least one polycarbonate that is not a polysiloxane block co-polycarbonate; a polysiloxane block co-polycarbonate; a transition metal oxide; a brominated organic flame retardant or a halogen organic flame retardant compound; optionally 0 to 1 wt % of a fluorinated polyolefin; optionally one or more additives that impart a desired performance property; and optionally a carbon black containing material, wherein said composition has a p(FTP)V0 flammability rating of greater than 0.85 at 1.5 mm or greater, 1.0 mm, or 0.8 mm or between 1.5 mm and 0.8 mm according to the method of UL 94, and further wherein the composition does not show tracking through at least 50 drops of a 0.1% aqueous ammonium chloride solution at 250V according to ASTM D-3638; and processing said polycarbonate containing material to form an article of manufacture.

The present disclosure further provides for articles of manufacture that contain the polycarbonate formulations described above.

C. Electrical Tracking Resistance/Impact/FR

The present disclosure provides for a composition comprising: at least one polycarbonate that is not a polysiloxane block co-polycarbonate; a polysiloxane block co-polycarbonate; a transition metal oxide; a brominated organic flame retardant or a halogen organic flame retardant compound; optionally 0 to 1 wt % of a fluorinated polyolefin; optionally one or more additives that impart a desired performance property; and optionally a carbon black containing material, wherein the composition has a notched izod impact at −30° C. of at least 35 kJ/m² at a thickness of 3.0 mm according to ISO-180 standard with a 5.5 J hammer and wherein said composition has a p(FTP)V0 flammability rating of greater than 0.85 at 1.5 mm, 1.0 mm, or 0.8 mm or between 1.5 mm and 0.8 mm according to the method of UL 94, and further wherein the composition does not show tracking through at least 50 drops of a 0.1% aqueous ammonium chloride solution at 250V according to ASTM D-3638.

The present disclosure further provides for a composition comprising: at least one polycarbonate that is a not a polysiloxane block-co-polycarbonate; 5 to 45 wt % of a polysiloxane block co-polycarbonate; 3 to 40 wt % of a transitional metal oxide; 1 to 10 wt % of bromine atoms from a brominated organic flame retardant or a halogen containing flame retardant; optionally 0 to 1 wt % of a fluorinated polyolefin; optionally one or more additives that impart a desired performance property; and optionally a carbon black containing material, wherein the composition has a notched izod impact at −30° C. of at least 35 kJ/m² at a thickness of 3.0 mm according to ISO-180 standard with a 5.5 J hammer and wherein the composition has a p(FTP)V0 flammability rating of greater than (">") 0.85 at 1.5 mm, 1.0 mm, or 0.8 mm or between 1.5 mm and 0.8 mm according to the method of UL 94, and further wherein the composition does not show tracking through at least 50 drops of a 0.1% aqueous ammonium chloride solution at 250V according to ASTM D-3638.

The present invention further provides for a method of controlling the tracking of an electrical current of an article of manufacture containing a polycarbonate containing material comprising: providing at least one polycarbonate that is not a polysiloxane block co-polycarbonate; a polysiloxane block co-polycarbonate; a transition metal oxide; a brominated organic flame retardant or a halogen organic flame retardant compound; optionally 0 to 1 wt % of a fluorinated polyolefin; optionally one or more additives that impart a desired performance property; and optionally a carbon black containing material, wherein the composition has a notched izod impact at −30° C. of at least 35 kJ/m² at a thickness of 3.0 mm according to ISO-180 standard with a 5.5 J hammer and wherein said composition has a p(FTP)V0 flammability rating>0.85 at 1.5 mm, 1.0 mm, or 0.8 mm or between 1.5 mm and 0.8 mm according to the method of UL 94, and further wherein the composition does not show tracking through at least 50 drops of a 0.1% aqueous ammonium chloride solution at 250V according to ASTM D-3638; and processing said polycarbonate containing material to form an article of manufacture.

The present disclosure further provides for articles of manufacture that contain the polycarbonate formulations described above.

DETAILED DESCRIPTION OF THE INVENTION

Definitions

Electrical tracking is defined as the formation of conductive pathways on the surface of a polymer under certain conditions and at a certain voltage. Electrical tracking in a plastic can be a source of fire in plastic parts that are used in electrical applications and so resistance to electrical tracking is often an important safety requirement for a plastic, which is used in certain electrical applications.

Electrical tracking resistance is the ability of a plastic formulation to resist electrical tracking under certain conditions and certain voltages. Electrical tracking resistance on molded polycarbonate articles is often measured using a test procedure identified as ASTM D-3638. A common method of reporting the electrical tracking resistance of a plastic is by its comparative tracking index rating (CTI). The CTI rating of plastic indicates how resistant a plastic material is to electrical tracking at certain voltages. CTI ratings range from CTI-0 to CTI-5 with a CTI-1 rating indicating that a plastic is more resistant to electrical tracking than a plastic with a lower CTI rating (for example CTI-3).

As stated above, the present invention provides for composition(s) or articles of manufacture derived therefrom, which address: at least electrical tracking resistance and impact performance; at least electrical tracking resistance and flame retardancy; and at least electrical tracking resistance, impact performance and flame retardancy. In addition, a method of controlling the tracking of an electrical current of a polycarbonate containing composition is also embodied in this disclosure.

The various elements described above: a polycarbonate; a polysiloxane block co-polycarbonate; titanium dioxide; a flame retardant compound; a fluorinated polyolefin; additives; and carbon black are described in a more particular manner below. This disclosure can encompass one or more aspects of each individual element and can contain other elements in addition to those that are described in this disclosure so long as the particular performance requirements of a given formulation/resin containing composition/article(s) of manufacture derived therefrom are met.

As used in the specification and the appended claims, the singular forms "a," "and" and "the" include plural references unless the context clearly dictates otherwise.

Transition metal oxides, e.g. titanium dioxide, include the base elements plus optionally other chemistries, such as a coating.

A. Polycarbonates

Polycarbonates are utilized in conjunction with other components of the claimed invention, e.g. in conjunction with the polysiloxane co-polycarbonates described below and transition metal oxides, an example of which is a composition containing titanium dioxide. The amount of polycarbonate will vary depending on the requisite performance properties of the end-use materials. For example, the amount of polycarbonate will be balanced with the amount of polysiloxane block co-polycarbonates added to a composition of matter, e.g. to balance the effect of adding polysiloxane block co-polycarbonates on electrical tracking resistance performance. In addition, additives/other chemistries must be selected so as not to substantially degrade the polycarbonate material or the electrical tracking resistance performance of the polycarbonate compositions. One of ordinary skill in the art can determine the amount of degradation of the polycarbonate without undue experimentation, as well as measure electrical tracking resistance via quantifying a CTI value as articulated in this disclosure. The polycarbonates can have various physical and chemical properties, but they have to be balanced so as to net a desired result—meet specific end-use requirements.

In one embodiment, the polycarbonates can be linear, branched, or a combination thereof.

Various types of polycarbonates that have a repeating structural background of the following formula (1):

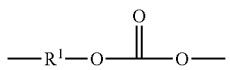

(1)

can be utilized for the claimed invention/inventions encompassed by this disclosure.

In one embodiment, the polycarbonate is derived from bisphenol-A.

In another embodiment, each $R^1$ group is a divalent aromatic group, for example derived from an aromatic dihydroxy compound of the formula (2):

HO-$A^1$-$Y^1$-$A^2$-OH    (2)

wherein each of $A^1$ and $A^2$ is a monocyclic divalent arylene group, and $Y^1$ is a single bond or a bridging group having one or two atoms that separate $A^1$ from $A^2$. In an exemplary embodiment, one atom separates $A^1$ from $A^2$.

In another embodiment, when each of $A^1$ and $A^2$ is phenylene, $Y^1$ is para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group or a saturated hydrocarbon group such as methylene, cyclohexylidene, or isopropylidene.

Included within the scope of formula (2) are bisphenol compounds of general formula (3):

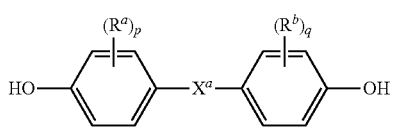

(3)

wherein $R^a$ and $R^b$ each represent a halogen atom or a monovalent hydrocarbon group and can be the same or different; p and q are each independently integers of 0 to 4; and $X^a$ represents a single bond or one of the groups of formulas (4) or (5):

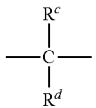

(4)

(5)

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. In particular, $R^c$ and $R^d$ are each the same hydrogen or $C_{1-4}$ alkyl group, specifically the same $C_{1-3}$ alkyl group, even more specifically, methyl.

In an embodiment, $R^c$ and $R^d$ taken together represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing a cyclic alkylene group comprises at least one heteroatom with a valency of 2 or greater, and at least two carbon atoms. Exemplary heteroatoms in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl.

In a specific exemplary embodiment, $X^a$ is a substituted $C_{3-18}$ cycloalkylidene of the formula (6):

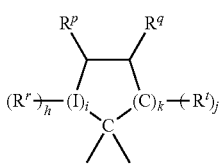

(6)

wherein each $R^r$, $R^p$, $R^q$, and $R^t$ is independently hydrogen, halogen, oxygen, or $C_{1-12}$ organic group; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (6) will have an unsaturated carbon-carbon linkage where the ring is fused. When k is 1 and i is 0, the ring as shown in formula (6) contains 4 carbon atoms, when k is 2, the ring as shown contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

When k is 3 and i is 0, bisphenols containing substituted or unsubstituted cyclohexane units are used, for example bisphenols of formula (7):

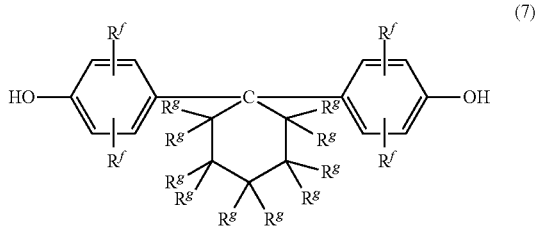

(7)

wherein each $R^f$ is independently hydrogen, $C_{1-12}$ alkyl, or halogen; and each $R^g$ is independently hydrogen or $C_{1-12}$ alkyl. The substituents can be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

Other useful dihydroxy compounds having the formula HO—$R^1$—OH include aromatic dihydroxy compounds of formula (8):

(8)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Some illustrative examples of dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9 to bis (4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that can be represented by formula (2) include 1,1-bis(4-hydroxyphenyl)methane, 1,1-bis(4-hydroxyphenyl)ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl) propane, 3,3-bis (4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used.

"Polycarbonate" as used herein includes homopolycarbonates, copolymers comprising different $R^1$ moieties in the carbonate (referred to herein as "copolycarbonates"), and copolymers comprising carbonate units and other types of polymer units, such as ester units.

In one specific embodiment, the polycarbonate is a linear homopolymer or copolymer comprising units derived from bisphenol A, in which each of $A^1$ and $A^2$ is p-phenylene and $Y^1$ is isopropylidene in formula (2). More specifically, at least 60%, particularly at least 80% of the $R^1$ groups in the polycarbonate are derived from bisphenol A.

Another specific type of copolymer is a polyester carbonate, also known as a polyester-polycarbonate. Such copolymers further contain, in addition to recurring carbonate chain units of the formula (1), repeating units of formula (9):

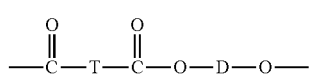

(9)

wherein D is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to 6 carbon atoms, specifically 2, 3, or 4 carbon atoms; and T divalent group derived from a dicarboxylic acid, and can be, for example, a $C_{2-10}$ alkylene group, a $C_{6-20}$ alicyclic group, a $C_{6-20}$ alkyl aromatic group, or a $C_{6-20}$ aromatic group.

In one embodiment, D is a $C_{2-30}$ alkylene group having a straight chain, branched chain, or cyclic (including polycyclic) structure. In another embodiment, D is derived from an aromatic dihydroxy compound of formula (3) above. In another embodiment, D is derived from an aromatic dihydroxy compound of formula (8) above.

Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 91:9 to 2:98. In another specific embodiment, D is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the final composition.

In a specific embodiment, the polyester unit of a polyester-polycarbonate can be derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol-A. In a specific embodiment, the polycarbonate units are derived from bisphenol A. In another specific embodiment, the polycarbonate units are derived from resorcinol and bisphenol A in a molar ratio of resorcinol carbonate units to bisphenol A carbonate units of 1:99 to 99:1.

The selection of a polycarbonate backbone of choice depends on many factors such as end use and other factors understood by one of ordinary skill the art.

In one embodiment, the polycarbonate is derived from at least one or more bisphenols and one of the bisphenols is Bisphenol-A.

In another embodiment, the polycarbonate can be linear, branched or a combination of linear and branched polycarbonates.

The polycarbonates of the claimed invention can contain branched polycarbonate(s). Various types of branching agents can be utilized for the claimed invention/inventions encompassed by this disclosure.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride (TMTC), tris-p-hydroxy phenyl ethane (THPE), 3,3-bis-(4-hydroxyphenyl)-oxindole (also known as isatin-bis-phenol), tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl)phenol), 4-chloroformyl phthalic anhydride, trimesic acid, and benzophenone tetracarboxylic acid. The branching agents can be added at a level of 0.05 to 2.0 wt. %. Mixtures comprising linear polycarbonates and branched polycarbonates can be used.

In some embodiments, a particular type of branching agent is used to create branched polycarbonate materials. These branched polycarbonate materials have statistically more than two end groups. The branching agent is added in an amount (relative to the bisphenol monomer) that is sufficient to achieve the desired branching content, that is, more than two end groups. The molecular weight of the polymer may become very high upon addition of the branching agent and may lead to viscosity problems during phosgenation. Therefore, in some embodiments, an increase in the amount of the chain termination agent is used in the polymerization. The amount of chain termination agent used when the particular branching agent is used is generally higher than if only a chain termination agent alone is used. The amount of chain termination agent used is generally above 5 mole percent and less than 20 mole percent compared to the bisphenol monomer.

In some embodiments, the branching agent is a structure derived from a triacid trichloride of the formula (10)

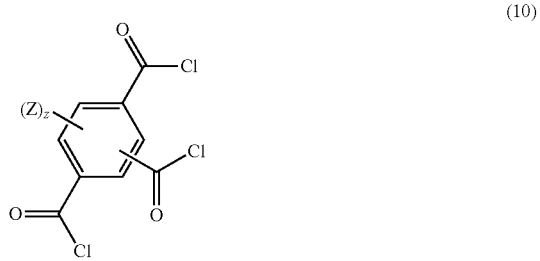

wherein Z is hydrogen, a halogen, $C_{1-3}$ alkyl group, $C_{1-3}$ alkoxy group, $C_{7-12}$ arylalkyl, alkylaryl, or nitro group, and z is 0 to 3; or a branching agent derived from a reaction with a tri-substituted phenol of the formula (11)

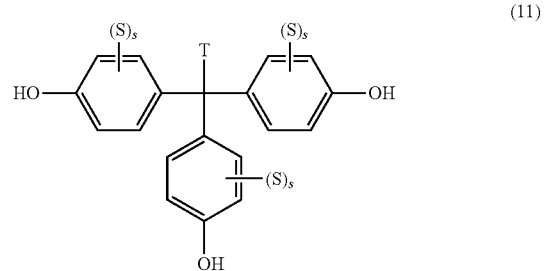

wherein T is a $C_{1-20}$ alkyl group, $C_{1-20}$ alkyleneoxy group, $C_{7-12}$ arylalkyl, or alkylaryl group, S is hydrogen, a halogen, $C_{1-3}$ alkyl group, $C_{1-3}$ alkoxy group, $C_{7-12}$ arylalkyl, alkylaryl, or nitro group, s is 0 to 4.

In another embodiment, the branching agent is a structure having formula (12)

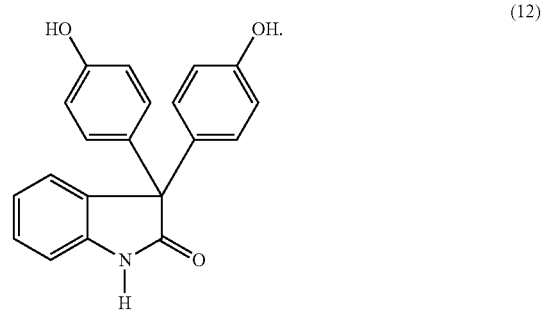 [SMILES: O=C1Nc2ccccc2C1(c1ccc(O)cc1)c1ccc(O)cc1]

Examples of specific branching agents that are particularly effective in the compositions include trimellitic trichloride (TMTC), tris-p-hydroxy phenyl ethane (THPE) and isatin-bis-phenol. In one embodiment, in formula (10), Z is hydrogen and z is 3. In another embodiment, in formula (11), S is hydrogen, T is methyl and s is 4.

The relative amount of branching agents used in the manufacture of the polymer will depend on a number of considerations, for example the type of $R^1$ groups, the amount of cyanophenol/end-capping agents, and the desired molecular weight of the polycarbonate. In general, the amount of branching agent is effective to provide about 0.1 to 10 branching units per 100 $R^1$ units, specifically about 0.5 to 8 branching units per 100 $R^1$ units, and more specifically about 0.75 to 5 branching units per 100 $R^1$ units. For branching agents having formula (10), the amount of branching agent tri-ester groups are present in an amount of about 0.1 to 10 branching units per 100 $R^1$ units, specifically about 0.5 to 8 branching units per 100 $R^1$ units, and more specifically about 0.75 to 5 tri-ester units per 100 $R^1$ units. For branching agents having formula (11), the amount of branching agent tricarbonate groups are present in an amount of about 0.1 to 10 branching units per 100 $R^1$ units, specifically about 0.5 to 8 branching units per 100 $R^1$ units, and more specifically about 0.75 to 5 tri-phenylcarbonate units per 100 $R^1$ units. In some embodiments, a combination of two or more branching agents may be used.

In one embodiment, the polycarbonate of said composition has a branching level of at least about 0.1% or at least 0.2% or at least 0.4% or at least about 1% or at least about 2% or at least about 3% or from about 1% to about 3%.

Various types of end-capping agents can be utilized to control the length of the polycarbonate material. End-capping agents may include monofunctional phenols or monofunctional alcohols, $C_1$-$C_{30}$ monochloroformates derived from monofunctional phenols or alcohols, $C_2$-$C_{30}$ monocarboxylic acids, and $C_2$-$C_{30}$ monocarboxylic acid chlorides.

In one embodiment, the end-capping agents are selected from at least one of the following: phenol or a phenol containing one or more substitutions with at least one of the following: aliphatic groups, olefinic groups, aromatic groups, halogens, ester groups, and ether groups.

Of particular usefulness commercially, in another embodiment, the end-capping agents are selected from at least one of the following: phenol, para-t-butylphenol or para-cumylphenol.

In another embodiment, the end-capping agent has a pKa between about 8.3 and about 11. In a further embodiment, the end-capping agent has a pKa of between 9 and 11.

The amount of polycarbonate will vary depending on the required performance properties of the end use materials, e.g. the amount of other chemistries in the final formulation that a part is molded therefrom.

In one embodiment, the composition contains at least 40%, based upon a total weight of the composition.

In another embodiment, the polycarbonate is not a polysiloxane block-co-polycarbonate.

B. Polysiloxane Block Co-Polycarbonates

A polysiloxane block co-polycarbonate is used to facilitate low temperature impact strength of the composition of matter, specifically, molded parts derived therefrom.

Although polysiloxane block co-polycarbonate materials have a positive impact on low temperature impact strength, polysiloxane block co-polycarbonates have a negative impact on electrical tracking resistance performance versus non-siloxane containing polycarbonates, and thus the amount of polysiloxane block co-polycarbonate needs to be balanced/off-set with other types of linear and/or branched polycarbonates, as described above in Section A, as well as balanced/off-set with amounts of other components such titanium dioxide, an electrical tracking resistance proponent. One of ordinary skill in the art can balance these components without undue experimentation.

In one embodiment, a polysiloxane block co-polycarbonate is formed from carbonate units derived from dihydroxy aromatic containing unit(s) and a polysiloxane containing unit(s) having dihydroxy aromatic end groups. Other protocols known to one of ordinary skill in the art can be utilized.

In another embodiment, the dihydroxy aromatic unit is bisphenol-A.

In another embodiment, the polysiloxane units have the following formula:

(13)

wherein each occurrence of R is same or different, and is a $C_{1-13}$ monovalent organic group. For example, R may independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups may be fully or partially halogenated with fluorine, chlorine, bromine, or iodine, or a combination thereof. Combinations of the foregoing R groups may be used in the same copolymer. In an embodiment, the polysiloxane comprises R groups that have a minimum hydrocarbon content. In a specific embodiment, an R group with a minimum hydrocarbon content is a methyl group.

The value of E in formula (13) may vary widely depending on the type and relative amount of each component in the thermoplastic composition, the desired properties of the composition, and like considerations. Herein, E has an average value of 4 to 100.

In another embodiment, E has an average value of 20 to 100.

In another embodiment, E has an average value of 20 to 75.

In a further embodiment, E has an average value of 35 to 55.

In another embodiment, polysiloxane units are derived from dihydroxy aromatic compound of formula (14):

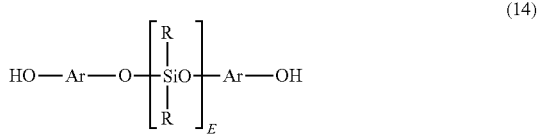

(14)

wherein E is as defined above; each R may independently be the same or different, and is as defined above; and each Ar may independently be the same or different, and is a substituted or unsubstituted $C_{6-30}$ arylene group, wherein the bonds are directly connected to an aromatic moiety. Suitable Ar groups in formula (14) may be derived from a $C_{6-30}$ dihydroxy aromatic compound, for example a dihydroxy aromatic compound of formula (2), (3), (7), or (8) above. Combinations comprising at least one of the foregoing dihydroxy aromatic compounds may also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis (4-hydroxyphenyl)ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl)cyclohexane, bis(4-hydroxyphenyl sulfide), and 1,1-bis(4-hydroxy-t-butylphenyl) propane. Combinations comprising at least one of the foregoing dihydroxy compounds may also be used. In an embodiment, the dihydroxy aromatic compound is unsubstituted, or is not substituted with non-aromatic hydrocarbon-containing substituents such as, for example, alkyl, alkoxy, or alkylene substituents.

In a specific embodiment, where Ar is derived from resorcinol, the polysiloxane repeating units are derived from dihydroxy aromatic compounds of formula (15):

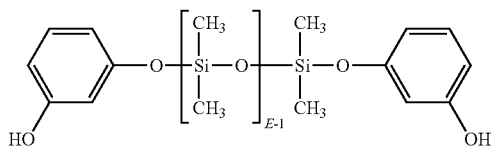

(15)

or, where Ar is derived from bisphenol-A, from dihydroxy aromatic compounds of formula (16):

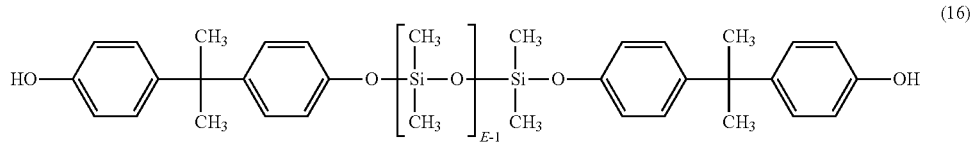

(16)

wherein E is as defined above.

In another embodiment, polysiloxane units are derived from dihydroxy aromatic compound of formula (17):

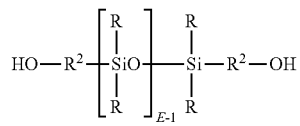

(17)

wherein R and E are as described above, and each occurrence of $R^2$ is independently a divalent $C_{1-30}$ alkylene or $C_{7-30}$ arylene-alkylene, and wherein the polymerized polysiloxane unit is the reaction residue of its corresponding dihydroxy aromatic compound. In a specific embodiment, where $R^2$ is $C_{7-30}$ arylene-alkylene, the polysiloxane units are derived from dihydroxy aromatic compound of formula (18):

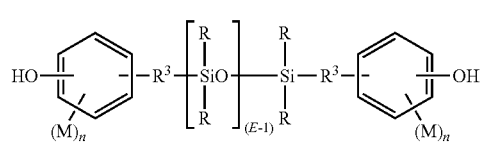

(18)

wherein R and E are as defined above. Each $R^3$ is independently a divalent $C_{2-8}$ aliphatic group. Each M may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4.

In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl.

In a specific embodiment, the polysiloxane units are derived from a dihydroxy aromatic compound of formula (19):

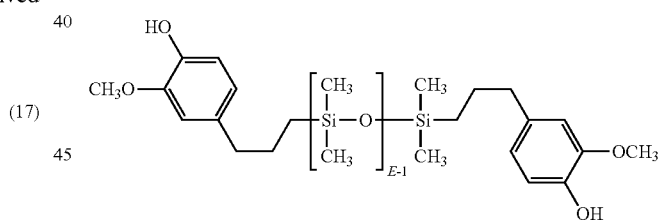

(19)

wherein E is as described above.

In another specific embodiment, the polysiloxane units are derived from dihydroxy aromatic compound of formula (20):

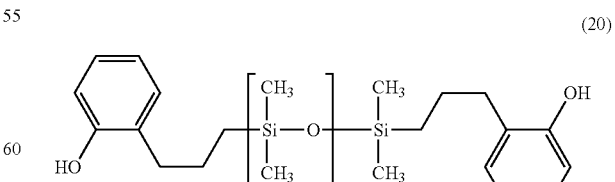

(20)

wherein E is as defined above.

Dihydroxy polysiloxanes typically can be made by functionalizing a substituted siloxane oligomer of formula (21):

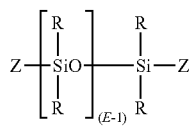

(21)

wherein R and E are as previously defined, and Z is H, halogen (Cl, Br, I), or carboxylate. Exemplary carboxylates include acetate, formate, benzoate, and the like. In an exemplary embodiment, where Z is H, compounds of formula (21) may be prepared by platinum catalyzed addition with an aliphatically unsaturated monohydric phenol. Suitable aliphatically unsaturated monohydric phenols included, for example, eugenol, 2-allylphenol, 4-allylphenol, 4-allyl-2-methylphenol, 4-allyl-2-phenylphenol, 4-allyl-2-bromophenol, 4-allyl-2-t-butoxyphenol, 4-phenyl-2-allylphenol, 2-methyl-4-propenylphenol, 2-allyl-4,6-dimethylphenol, 2-allyl-4-bromo-6-methylphenol, 2-allyl-6-methoxy-4-methylphenol, and 2-allyl-4,6-dimethylphenol. Combinations comprising at least one of the foregoing may also be used. Where Z is halogen or carboxylate, functionalization may be accomplished by reaction with a dihydroxy aromatic compound of formulas (2), (3), (7), (8), or a combination comprising at least one of the foregoing dihydroxy aromatic compounds. In an exemplary embodiment, compounds of formula (11) may be formed from an alpha, omega-bisacetoxypolydiorangonosiloxane and a dihydroxy aromatic compound under phase transfer conditions.

In one embodiment, the polysiloxane block co-polycarbonate is derived from at least Bisphenol-A and polysiloxane bisphenol having the following structure 1,

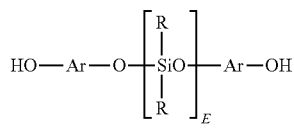

(1)

wherein R comprises a $C_1$-$C_{30}$ aliphatic or an aromatic group or a combination of said aliphatic or said aromatic groups and Ar comprises a $C_6$-$C_{30}$ aromatic group or a combination of aromatic and aliphatic groups and E has an average value of 20 to 100.

In another embodiment, the polysiloxane block co-polycarbonate is derived from at least Bisphenol-A and a polysiloxane bisphenol having the following structure 2,

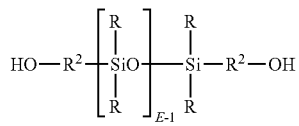

wherein, R comprises a $C_1$-$C_{30}$ aliphatic or aromatic group or a combination of said aliphatic and said aromatic groups R2 comprises a $C_7$-$C_{30}$ aliphatic or a combination of aliphatic and aromatic groups and E-1 has an average value of 20 to 100.

In another embodiment, the average value of E of structure 1 is 20 to 100 or the average value of E-1 of structure 2 is 20 to 60.

In another embodiment, the average value of E of structure 1 between 30 and 50 or the average value of E-1 of structure 2 is 20 to 50.

In another embodiment, the polysiloxane block co-polycarbonate is derived from at least Bisphenol-A and a polysiloxane bisphenol having the structure of formula:

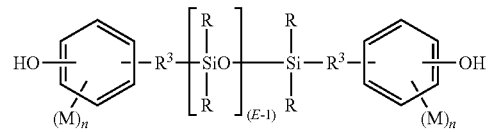

wherein R and E are as defined above. Each $R^3$ is independently a divalent $C_{2-8}$ aliphatic group. Each M may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4, wherein E has an average value of 20 to 100.

The amount of polysiloxane block co-polycarbonate can vary in the above formulations with the restriction of meeting desired end-use performance characteristics of a particular composition of matter or molded part derived therefrom.

In one embodiment, the composition has 5 to 45 wt % polysiloxane block co-based on the total weight of the composition\

In another embodiment, the composition has greater than about 17 wt % polysiloxane block co-polycarbonate. In a further embodiment, the composition has about 17.5 wt % of said polysiloxane block co-polycarbonate based on the total weight of the composition.

C. Titanium Dioxide/Transition Metal Oxides

Transition metal oxides, e.g. titanium dioxide, have been surprisingly found as a useful additive for improving electrical tracking resistance performance in polycarbonate containing formulations, especially compared to mineral fillers with similar dielectric constants.

Oxides of transition metals seem to offer superior performance over metal oxides of alkali or alkaline earth metals as illustrated in Table 1 below. As illustrated in Table 1 below, electrical tracking resistance of other mineral fillers were tested with similar dielectric constants to transition metal oxides under a specified set of conditions.

In one embodiment, titanium dioxide improves the electrical tracking resistance performance of a polycarbonate containing formulation.

In another embodiment, chromium oxide (also known as chromium (III) oxide) improves the electrical tracking resistance performance of a polycarbonate containing formulations.

TABLE 1

| Mineral | Level | INI at −23° C. [kJ/m2] | INI at −30° C. [kJ/m2] | CTI at 250 V [drops] |
|---|---|---|---|---|
| Reference | — | 71 | 66 | 22 |
| TiO$_2$ (uncoated) | 5% | 66 | 61 | 93 |
| | 10% | 61 | 57 | 100 |
| Cr$_2$O$_3$ | 5% | 58 | 18 | 66 |
| ZnB | 5% | 56 | 17 | 25 |

TABLE 1-continued

| Mineral | Level | INI at −23° C. [kJ/m2] | INI at −30° C. [kJ/m2] | CTI at 250 V [drops] |
|---|---|---|---|---|
| $ZnO_2$ | 5% | 56 | 19 | |
| | 10% | 57 | 25 | |
| $BaSO_4$ | 5% | 43 | 13 | 18 |
| $CaSO_4$ | 5% | 11 | 9 | 17 |
| Calcium Hydroxy Apatite | 5% | 23 | 12 | 30 |
| Alumina | 5% | 14 | 13 | 21 |
| Nano Alumina | 5% | 53 | 43 | 15 |
| $BaTiO_3$ | 2% | 61 | 53 | 23 |
| | 5% | 54 | 47 | 40 |
| $BaTiO_3$ + mica | 2.5 + 2.5% | 46 | 16 | 15 |
| $BaTiO_3$ + PEG | 5 + 1% | 44 | 20 | 24 |
| Mica | 5% | 19 | 13 | 18 |
| | 10% | 11 | 9 | 14 |

More specifically, titanium dioxide has been found to be particularly useful in improving electrical tracking resistance performance in polycarbonate formulations.

The selection of the type of coating on titanium oxide and the average particle size of the titanium oxide as well as the amounts of the titanium oxide used in the polycarbonate formulation encompassed by this disclosure will depend on the particular balance of properties among electrical tracking resistance performance, low temperature impact, and flame performance that is required or sought in a particular polycarbonate based product.

For example, titanium dioxide can have a slight negative impact on flame retardant performance and thus to achieve both flame retardancy and electrical tracking resistance performance at a certain level, then there needs to be a delicate balance of addition of both components. One of ordinary skill in the art could balance the amounts of titanium dioxide with the amount of flame retardant without undue experimentation. The type and amount of flame retardant selected also has an effect on achieving desired performance levels for electrical tracking resistance and flame retardancy. In cases where impact performance is needed as well, the selection of the right combination of polycarbonates and polysiloxane block co-polycarbonates need to be weighed in as well, as exemplified in this disclosure.

In one embodiment, the titanium oxide particles may have an inorganic coating, which may be an alumina coating, without an organic coating.

In another embodiment, the titanium oxide may have an organic coating, which may be a polysiloxane coating.

In another embodiment, the amount of titanium oxide is in the range of from 3 to 40 wt %, or from 5 to 30 weight (wt) %, or in the range of 5 to 25 wt %, or from 5 to 20 wt % or from 5 to 10 wt %, based on the total weight of the polycarbonate formulations.

In another embodiment, the titanium dioxide has a particle size of less than 50.0 nm, or less than 350 nm, or between 50 nm and 350 nm, or 100 nm to 350 nm, or 150 nm to 250 nm, or 100 nm to 200 nm.

In another embodiment, the amount of titanium dioxide is about 3 to about 40 wt % based on the total weight of said polycarbonate formulations.

In another embodiment, the amount of titanium dioxide is 5 to about 25 wt % of said polycarbonate based on the total weight of said polycarbonate formulations.

In another embodiment, the amount of titanium dioxide is about 5 wt % to about 10 wt % based on the total weight of said polycarbonate formulations.

D. Flame Retardants

The selection of the correct flame retardant is not only critical for achieving a good flame retardant rating, such as a V0 rating under UL 94, it is also important in applications that need to have good electrical tracking resistance performance. Without being bound by theory, char formation processes required for a good flame retardant rating often results in poor tracking behavior and therefore a high CTI class. Data Tables 5 and 6 in the Experimental Section of this application show results for the addition of various flame retardant additives to polysiloxane block co-polycarbonate blends that contain 5% $TiO_2$. In addition, Data Tables 5 and 6 also show that the amount of flame retardant added to the formulation does have an influence on low temperature impact and ductility so there is also a need to balance the amount of flame retardant aside from the selection of flame retardant. Moreover, brominated based flame retardants, as shown in Data Tables 5 and 6 can provide a composition that meets electrical tracking resistance requirements and flame retardant performance as determined using the UL94 V0 p(FTP) method at 1.5 mm or at 0.8 mm part thicknesses, with or without the presence of an anti-drip agent such as PTFE or TSAN.

In one embodiment, the composition excludes potassium diphenylsulfone sulfonate (KSS) and potassium perfluorobutane sulfonate (Rimar) salts.

In another embodiment the composition includes a combination of brominated organic flame retardants and diphenylsulfone sulfonate (KSS) and potassium perfluorobutane sulfonate (Rimar) salts.

Other non-salt organic flame retardants such as diphenyl Phosphate (BPADP) may also have a positive effect on electrical tracking resistance performance compared to KSS and Rimar salts.

In one embodiment, the flame retardant is a halogen containing organic flame retardant.

In another embodiment, the flame retardant is a brominated organic flame retardant.

In another embodiment, the composition has at least 10 wt % brominated polycarbonate based on the total weight of the composition.

In another embodiment, the composition contains at least 20% brominated polycarbonate based on the total weight of the composition.

In another embodiment, the brominated organic flame retardant has a bromine content of between 0.3 and 10 wt % bromine atoms based on the total weight of the composition. In a further embodiment, the bromine content is between 1.0 and 10 wt % bromine atoms based on the weight of the total composition. In a further embodiment the bromine content is between 2 and 10 wt % based on the weight of the total composition. In a further embodiment the bromine content is between 2 and 6 wt % based on the total weight of the composition. In a further embodiment the bromine content is between 2.5 and 3 wt % based on the total weight of the composition.

In another embodiment, the brominated organic flame retardant is at least one of the following: a brominated polycarbonate, a brominated polycarbonate oligomer, a brominated acrylate, a brominated polyether, a brominated epoxy oligomer, and a brominated phthalimide.

In another embodiment, the brominated organic flame retardant is at least one of the following: TBBPA-BPA copolymer (TBBPA=tetrabromobisphenol-A), TBBPA oligomer (pentamer), poly(pentabromobenzylacrylate), brominated epoxy, brominated epoxy oligomer, end-capped brominated epoxy, brominated epoxy polymer, and 1,2-bis (tetrabromophthalimido)ethane. Data Tables 5 and 6 shows examples of brominated polycarbonates.

In another embodiment, the brominated organic flame retardant is a polycarbonate copolymer derived from at least a bisphenol-A and 2,2',6,6'-tetrabromo bisphenol-A and wherein the average wt % of bromine atoms in the polycarbonate copolymer is 26 wt % based on the total weight of the polycarbonate copolymer.

Aside from brominated organic flame retardants, phosphorous containing flame retardants can be utilized, such as BPADP. More specifically, useful flame-retardants include organic compounds that include phosphorus, bromine, and/or chlorine. Non-brominates and non-chlorinated phosphorus-containing flame-retardants can be preferred in certain applications for regulatory reasons, for example organic phosphates and organic compounds containing phosphorus-nitrogen bonds.

D1. Flame Retardant Testing Procedure & Description of Testing Components

Different composition of flame-retarded additives and PC are mixed together and pre-blended. Extrusion and molding is carried out under normal polycarbonate processing condition.

Flammability testing was conducted using the standard Underwriters Laboratory UL 94 test method (2 day conditioning), except that 20 bars rather than the usual 5 bars were tested. Specimens are to be preconditioned in an air-circulating oven for 48 hours at 23±1° C. and then cooled in the desiccator for at least 4 hours at room temperature, prior to testing. Once removed from the desiccator, specimens shall be tested within 30 minutes. The data was analyzed by calculation of the average flame out time, standard deviation of the flame out time and the total number of drips. Statistical methods were used to convert the data to a probability that a specific formulation would achieve a first time V0 pass or "p(FTP)" in the standard UL 94 testing of 5 bars. The first time pass (FTP) in that case refers to the first time a material is submitted to UL. Preferably p(FTP) values will be 1 or very close to 1 for high confidence that a sample formulation would achieve a V0 rating in UL 94 testing. A p(FTP) value below 0.85 for a sample formulation was considered too low to predict a UL 94 rating of V0 for that formulation.

Flammability tests were performed following the procedure of Underwriter's Laboratory Bulletin 94 entitled "Tests for Flammability of Plastic Materials, UL94." Several ratings can be applied based on the rate of burning, time to extinguish, ability to resist dripping, and whether or not drips are burning. According to this procedure, materials can be classified as UL94 HB, V0, V1, V2, on the basis of the test results obtained for five samples. The criteria for each of these flammability classifications are described below.

HB: In a 5-inch sample, placed so that the long axis of the sample is horizontal to the flame, the rate of burn of the sample is less than 3 inches per minute, and the flame is extinguished before 4 inches of sample are burned.

V0: In a sample placed so that its long axis is 180 degrees to the flame, the average period of flaming and/or smoldering after removing the igniting flame does not exceed ten seconds and none of the vertically placed samples produces drips of burning particles that ignite absorbent cotton. Five bar flame out time (FOT) is the sum of the flame out time for five bars, each lit twice for a maximum flame out time of 50 seconds.

V1: In a sample placed so that its long axis is 180 degrees to the flame, the average period of flaming and/or smoldering after removing the igniting flame does not exceed 30 sec and none of the vertically placed samples produces drips of burning particles that ignite absorbent cotton. Five bar flame out time is the sum of the flame out time for five bars, each lit twice for a maximum flame out time of 250 seconds.

V2: In a sample placed so that its long axis is 180 degrees to the flame, the average period of flaming and/or smoldering after removing the igniting flame does not exceed 30 sec, but the vertically placed samples produce drips of burning particles that ignite cotton. Five bar flame out time is the sum of the flame out time for five bars, each lit twice for a maximum flame out time of 250 seconds.

E. Anti-Drip Agents

Anti-drip agents can also be used in the composition, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. An exemplary TSAN can comprise 50 weight percent PTFE and 50 weight percent SAN, based on the total weight of the encapsulated fluoropolymer. The SAN can comprise, for example, 75 weight percent styrene and 25 weight percent acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer.

In another embodiment, the fluorinated polyolefin is a fibril forming fluorinated polyolefin.

In another embodiment, the fibril forming fluorinated polyolefin is a polytetrafluoroethylene.

In another embodiment, the polytetrafluorethylene is combined with polystyrene acrylonitrile (SAN).

The amount of anti-drip agent can vary, depending, for example, on performance properties. Sometimes an antidrip agent may be necessary and other times it is not necessary.

In one embodiment, the anti-drip agent in said composition is from 0 wt % to about 1 wt %. In another embodiment, the anti-drip agent in said composition is 0.3 wt %. FIG. 3 (TSAN figure) shows the effects of various formulations containing PTFE and TSAN.

In another embodiment, the composition contains up to about 1 wt % of an antidrip agent, e.g. PTFE and/or TSAN.

F. Additives

Various additives, other than anti-drip agents, can be incorporated into the composition of matters encompassed by this disclosure/claimed invention. In addition, surface additives can be added to molded parts derived from said composition.

In one embodiment, the composition contains one or more additives selected from at least one of the following: UV stabilizing additives, thermal stabilizing additives, mold release agents, colorants, organic and inorganic fillers, and gamma-stabilizing agents.

The amount of additives depend on various factors that would be recognized by one of ordinary skill the art, including, but not limited to, end-use requirements and/or effect on electrical tracking resistance, flame retardancy, and/or impact strength.

G. Carbon Black

Carbon black can also be utilized in the composition encompassed by this disclosure.

Carbon back is widely used in the plastics industry as a colorant to create black or grey products.

One purpose of carbon black in formulations embodied by this disclosure is to impart a black or a gray appearance to a molded part derived therefrom. Specifically, the addition of $TiO_2$ tends to whiten the color of a molded product and therefore the addition of carbon black, facilitates the gray or grayish black color appearance of a product that is molded from a formulation containing $TiO_2$.

The selection of the type of carbon black and the amount of carbon black used in the electrical tracking resistance formulation depends on the flame retardance, low temperature impact and electrical tracking resistance performance, in combination with the color of the part desired. In some formulations the addition of carbon black provides a grayish color and also improves flame retardancy. At higher levels carbon black provides a darker color but there may be a negative influence on both impact and electrical tracking resistance performance.

Carbon black can be obtained from various suppliers, including, Degussa and Cabot Company.

In another embodiment, the wt % of the carbon black in the composition is less than 1 wt % based on the total weight of the composition.

In another embodiment, the wt % of the carbon black in the composition is less than or equal to 0.5 wt % based on the total weight of the composition.

In another embodiment the wt % of the carbon black in the composition is greater than or equal to 0.25 wt % but less than or equal to 0.5 wt %.

H. Polycarbonate Synthesis Protocols and Formulation Protocols

Polycarbonate containing materials can be manufactured by processes such as interfacial polymerization or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 11. The most commonly used water immiscible solvents include methylene chloride, 1,2-dichloroethane, chlorobenzene, toluene, and the like.

Exemplary carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among tertiary amines that can be used are aliphatic tertiary amines such as triethylamine, tributylamine, cycloaliphatic amines such as N,N-diethyl-cyclohexylamine and aromatic tertiary amines such as N,N-dimethylaniline.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst can be 0.1 to 10 wt. % based on the weight of bisphenol in the phosgenation mixture. In another embodiment an effective amount of phase transfer catalyst can be 0.5 to 2 wt. % based on the weight of bisphenol in the phosgenation mixture.

Alternatively, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing.

Exemplary transesterification catalysts for making polycarbonate using a melt process include acetates, carbonates, borates, borohydrides, oxides, hydroxides, hydrides, and alcoholates of various metals including alkali metals such as lithium, sodium, and potassium, alkali earth metals such as magnesium, calcium and barium and other metals such as zinc, cadmium, tin, antimony, lead, manganese cobalt, or nickel. In addition, other useful transesterification catalysts include basic salts of nitrogen or phosphorus such as tetrabutylammonium hydroxide, methyltributylammonium hydroxide, tetrabutylammonium acetate, tetrabutylphosphonium hydroxide, tetrabutylphosphonium acetate, tetrabutylphosphonium phenolate. Combinations of at least one of the foregoing are also useful.

Thermoplastic compositions comprising the polycarbonates and other elements of desired formulation can be manufactured by various methods. For example, polycarbonate, polysiloxane block co-polycarbonates, flame retardant (e.g. brominated organic flame retardant), titanium dioxide and/or carbon black and/or other optional components are first blended in a HENSCHEL-Mixer® high speed mixer. Other low shear processes, including but not limited to hand mixing, can also accomplish this blending. The blend is then fed into the throat of a single or twin-screw extruder via a hopper. Alternatively, at least one of the components can be incorporated into the composition by feeding directly into the extruder at the throat and/or downstream through a side-stuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less, as desired. Such pellets can be used for subsequent molding, shaping, or forming.

Protocols may be adjusted so as to obtain a desired product within the scope of this disclosure and this can be done without undue experimentation.

I. Articles of Manufacture

Various articles of manufacture derived from the claimed compositions are encompassed by this disclosure.

In one embodiment, an insulating material comprising the compositions encompassed by this invention is disclosed.

In another embodiment, at least one of the following articles are contained in or are derived from the compositions encompassed by this disclosure: a solar apparatus, an electrical junction box, an electrical connector, an electrical vehicle charger, an outdoor electrical enclosure, a smart meter enclosure, a smart grid power node, PV (photovoltaic) frame, and minature circuit breaker (MCB) applications.

Shaped, formed, or molded articles comprising the polycarbonate resin compositions are provided herein. The compositions can be molded into useful shaped articles by a variety of means such as injection molding, extrusion, rotational molding, blow molding and thermoforming to form articles. One of ordinary skill in the art can select the protocol without undue experimentation to meet end-sue requirements.

J. Preferred Embodiments

J1. Electrical Tracking Resistance/Impact

As stated above, the composition comprises: at least one polycarbonate that is a not a polysiloxane block-co-polycarbonate; a polysiloxane block co-polycarbonate; a transition metal oxide; optionally a brominated organic flame retardant; optionally a fluorinated polyolefin; optionally one or more additives that impart a desired performance property; and optionally a carbon black containing material, wherein the composition has a notched izod impact at −30° C. of at least 35 kJ/m$^2$ at a thickness of 3.0 mm according to ISO-180 standard with a 5.5 J hammer and further wherein the composition does not show tracking through at least 50 drops of a 0.1% aqueous ammonium chloride at 250V according to ASTM D-3638.

In one embodiment, the polycarbonate is derived from at least one or more bisphenols and one of the bisphenols is Bisphenol-A.

In another embodiment, the polysiloxane block co-polycarbonate is derived from at least Bisphenol-A or dihydroxy aromatic containing unit(s), and polysiloxane bisphenol having the structure 1,

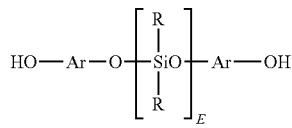

wherein R comprises a $C_1$-$C_{30}$ aliphatic or an aromatic group or a combination of said aliphatic or said aromatic groups and Ar comprises a $C_6$-$C_{30}$ aromatic group or a combination of aromatic and aliphatic groups and E has an average value of 20 to 100.

or structure 2,

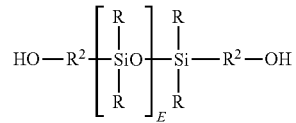

wherein R comprises a $C_1$-$C_{30}$ aliphatic or aromatic group or a combination of said aliphatic and said aromatic groups, $R^2$ comprises a $C_7$-$C_{30}$ aliphatic or a combination of aliphatic and aromatic groups and E has an average value of 20 to 100.

In another embodiment, the average value of E of structure 1 is 20 to 60.

In another embodiment, the average value of E of structure 1 30 to 50.

In another embodiment, the transition metal oxide is a titanium dioxide.

In another embodiment, the titanium dioxide is an inorganic coated titanium dioxide without an organic coating.

In another embodiment, the titanium dioxide is an organic coated titanium dioxide with an organic coating.

In another embodiment, the organic coating is a polysiloxane coating.

In another embodiment, the brominated organic flame retardant has a bromine content of between 0.3 and 10 wt % bromine atoms based on the total weight of the composition.

In a further embodiment, the bromine content is between 1.0 and 10 wt % bromine atoms based on the weight of the total composition. In a further embodiment the bromine content is between 2 and 10 wt % based on the weight of the total composition. In a further embodiment the bromine content is between 2 and 6 wt % based on the total weight of the composition. In a further embodiment the bromine content is between 2.5 and 3 wt % based on the total weight of the composition.

In another embodiment, the transitional metal oxide is chromium dioxide.

In another embodiment, the polysiloxane block co-polycarbonate is derived from at least Bisphenol-A or dihydroxy aromatic containing unit(s), and polysiloxane bisphenol having the structure 3:

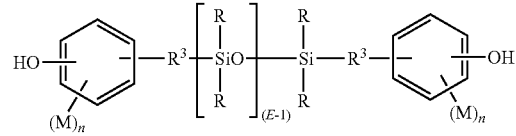

wherein R comprises a $C_1$-$C_{30}$ aliphatic or an aromatic group or a combination of said aliphatic or said aromatic groups, $R^3$ is independently a divalent $C_{2-8}$ aliphatic group, M may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4, and wherein E has an average value of 20 to 100. In a further embodiment, the transitional metal oxide is titanium dioxide with an average particle size of greater than or equal to 100 nm. In yet a further embodiment, the transitional metal oxide is titanium dioxide with an average particle size of less than 350 nm.

In another embodiment, the composition comprises: a polycarbonate that is a not a polysiloxane block-co-polycarbonate; 5 to 45 wt % of a polysiloxane block co-polycarbonate; 3 to 40 wt % of a transitional metal oxide; optionally a brominated organic flame retardant; optionally a fluorinated polyolefin; optionally one or more additives that impart a desired performance property; and optionally a carbon black containing material, wherein the composition has a notched izod impact of at −30° C. of at least 35 kJ/m² at a thickness of 3.0 mm according to ISO-180 standard with a 5.5 J hammer and further wherein the composition does not show tracking through at least 50 drops of a 0.1% aqueous ammonium chloride solution at 250V according to ASTM D-3638. In a further embodiment, the transitional metal oxide is titanium dioxide or other transition metal oxides encompassed by this disclosure.

In further embodiment, the polysiloxane block co-polycarbonate is derived from at least Bisphenol-A or dihydroxy aromatic containing unit(s), and polysiloxane bisphenol having the structure 3:

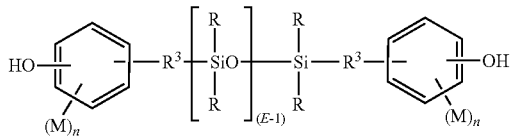

wherein R comprises a $C_1$-$C_{30}$ aliphatic or an aromatic group or a combination of said aliphatic or said aromatic groups, $R^3$ is independently a divalent $C_{2-8}$ aliphatic group, M may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4, and wherein E has an average value of 20 to 100. In yet a further embodiment, when the polycarbonate that is derived from structure 3, contains a transitional metal oxide that is titanium dioxide or other transition metal oxides encompassed by this disclosure.

In a further embodiment, the polysiloxane block co-polycarbonate is derived from at least Bisphenol-A or dihydroxy aromatic containing unit(s), and a polysiloxane bisphenol having the structure

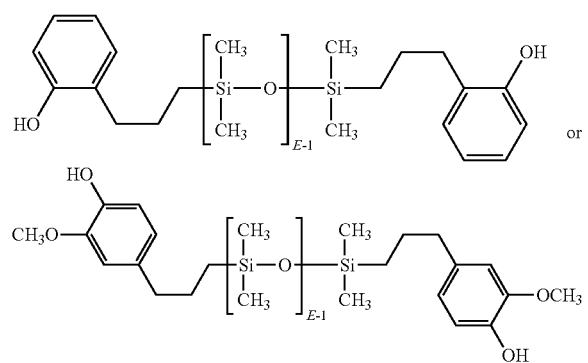

wherein E is an average value 35 to 55.

In another embodiment, the composition has 7.5 to 25 wt % of a polysiloxane block co-polycarbonate; 5 to 15 wt % of titanium dioxide; optionally 2 to 6 wt % of a brominated organic flame retardant; and optionally 0.1 to 0.5 wt % of a fluorinated polyolefin.

Compositions encompassed by this disclosure can include carbon black. In one embodiment, the wt % of the carbon black in the composition is less than 1 wt % based on the total weight of the composition.

In another embodiment, the wt % of the carbon black in the composition is less than 0.5 wt % based on the total weight of the composition.

The compositions encompassed by this disclosure can be used to make various articles of manufacture.

In one embodiment, the article of manufacture contains a polycarbonate that is at least one polycarbonate that is not a polysiloxane block-co-polycarbonate; a polysiloxane block co-polycarbonate; a transition metal oxide; optionally a brominated organic flame retardant; optionally a fluorinated polyolefin; optionally one or more additives that impart a desired performance property; and optionally a carbon black containing material, wherein the composition has a notched izod impact at −30° C. of at least 35 kJ/m² at a thickness of 3.0 mm according to ISO-180 standard with a 5.5 J hammer and further wherein the composition does not show tracking through at least 50 drops of a 0.1% aqueous ammonium chloride at 250V according to ASTM D-3638. In a further embodiment, the transition metal oxide is titanium dioxide or other transition metal oxides encompassed by this disclosure.

In another embodiment, the article of manufacture contains a polysiloxane block co-polycarbonate that is derived from at least Bisphenol-A or dihydroxy aromatic containing unit(s), and polysiloxane bisphenol having the structure 1,

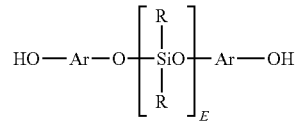

wherein R comprises a $C_1$-$C_{30}$ aliphatic or an aromatic group or a combination of said aliphatic or said aromatic groups and Ar comprises a $C_6$-$C_{30}$ aromatic group or a combination of aromatic and aliphatic groups and E has an average value of 20 to 100.

or structure 2,

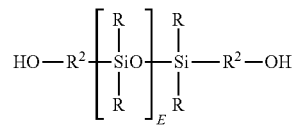

wherein R comprises a $C_1$-$C_{30}$ aliphatic or aromatic group or a combination of said aliphatic and said aromatic groups, R2 comprises a $C_7$-$C_{30}$ aliphatic or a combination of aliphatic and aromatic groups and E has an average value of 20 to 100. In a further embodiment, the transition metal oxide is titanium dioxide or other transition metal oxides encompassed by this disclosure.

In another embodiment, the article of manufacture contains composition comprising: at least one a polycarbonate that is a not a polysiloxane block-co-polycarbonate; 5 to 45 wt % of a polysiloxane block co-polycarbonate; 3 to 40 wt % of a transitional metal oxide; optionally a brominated organic flame retardant; optionally a fluorinated polyolefin; optionally one or more additives that impart a desired performance property; and optionally a carbon black containing material, wherein the composition has a notched izod impact of at −30° C. of at least 35 kJ/m² at a thickness of 3.0 mm according to ISO-180 standard with a 5.5 J hammer and further wherein the composition does not show tracking through at least 50 drops of a 0.1% aqueous ammonium chloride solution at 250V according to ASTM D-3638.

In a further embodiment, the article of manufacture contains a polysiloxane block co-polycarbonate that is derived from at least Bisphenol-A or dihydroxy aromatic containing unit(s) and polysiloxane bisphenol having the structure 3:

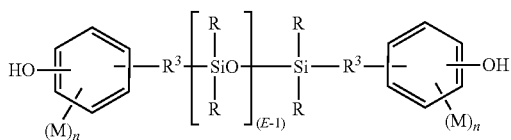

R comprises a $C_1$-$C_{30}$ aliphatic or an aromatic group or a combination of said aliphatic or said aromatic groups, $R^3$ is independently a divalent $C_{2-8}$ aliphatic group, M may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4, wherein E has an average value of 20 to 100.

In a further embodiment, the article of manufacture contains a polysiloxane block co-polycarbonate derived from at least Bisphenol-A or dihydroxy aromatic containing unit(s), and a polysiloxane bisphenol having the structure

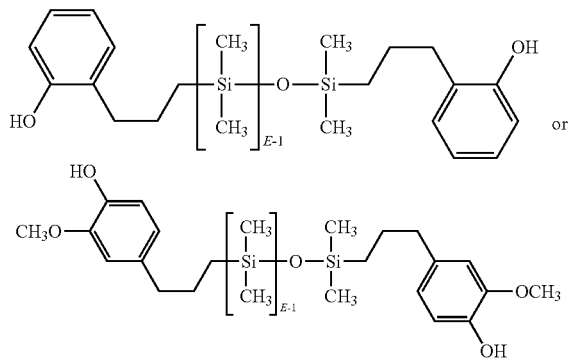

wherein E is average value of 35 to 55.

In another embodiment, the article of manufacture is an insulating material.

In another embodiment, the article of manufacture is selected from at least one of the following: a solar apparatus, an electrical junction box, an electrical connector, an electrical vehicle charger, an outdoor electrical enclosure, a smart meter enclosure, a smart grid power node, PV frame, and MCB applications. The compositions of this disclosure can be embodied in at least one of these apparatuses.

In another embodiment, the article of manufacture is a junction box. The compositions of this disclosure can be embodied in this apparatus.

A method of controlling the tracking of an electrical current of an article of manufacture containing a polycarbonate containing material is encompassed by this disclosure.

In one embodiment, a method of controlling the tracking of an electrical current of an article of manufacture containing a polycarbonate containing material comprises providing at least one polycarbonate that is a not a polysiloxane block-co-polycarbonate; a polysiloxane block co-polycarbonate; a transition metal oxide; optionally a brominated organic flame retardant; optionally a fluorinated polyolefin; optionally one or more additives that impart a desired performance property; and optionally a carbon black containing material, wherein the composition has a notched izod impact at −30° C. of at least 35 kJ/m² at a thickness of 3.0 mm according to ISO-180 standard with a 5.5 J hammer and further wherein the composition does not show tracking through at least 50 drops of a 0.1% aqueous ammonium chloride at 250V according to ASTM D-3638. In a further embodiment, the transition metal oxide is titanium dioxide or other transition metal oxides encompassed by this disclosure; and processing said polycarbonate containing material to form an article of manufacture.

In a further embodiment, a method of controlling the tracking of an electrical current of an article of manufacture contains a polysiloxane block co-polycarbonate that is derived from at least Bisphenol-A or dihydroxy aromatic containing unit(s), and polysiloxane bisphenol having the structure 1,

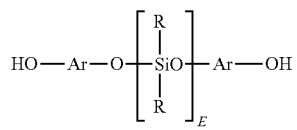

wherein R comprises a $C_1$-$C_{30}$ aliphatic or an aromatic group or a combination of said aliphatic or said aromatic groups and Ar comprises a $C_6$-$C_{30}$ aromatic group or a combination of aromatic and aliphatic groups and E has an average value of 20 to 100.

or structure 2,

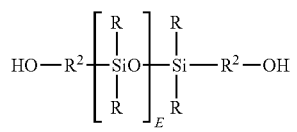

wherein R comprises a $C_1$-$C_{30}$ aliphatic or aromatic group or a combination of said aliphatic and said aromatic groups, R2 comprises a $C_7$-$C_{30}$ aliphatic or a combination of aliphatic and aromatic groups and E has an average value of 20 to 100; disclosure; and processing said polycarbonate containing material to form an article of manufacture. In a further embodiment, the transition metal oxide is titanium dioxide or other transition metal oxides encompassed by this disclosure.

In another embodiment, a method of controlling the tracking of an electrical current of an article of manufacture containing a polycarbonate containing material comprises providing at least one polycarbonate that is a not a polysiloxane block-co-polycarbonate; 5 to 45 wt % of a polysiloxane block co-polycarbonate; 3 to 40 wt % of a transitional metal oxide; optionally a brominated organic flame retardant; optionally a fluorinated polyolefin; optionally one or more additives that impart a desired performance property; and optionally a carbon black containing material, wherein the composition has a notched izod impact of at −30° C. of at least 35 kJ/m² at a thickness of 3.0 mm according to ISO-180 standard with a 5.5 J hammer and further wherein the composition does not show tracking through at least 50 drops of a 0.1% aqueous ammonium chloride solution at 250V according to ASTM D-3638; and processing said polycarbonate containing material to form an article of manufacture.

In further embodiment, a method of controlling the tracking of an electrical current of an article of manufacture contains a polysiloxane block co-polycarbonate that is derived from at least Bisphenol-A or dihydroxy aromatic containing unit(s) and polysiloxane bisphenol having the structure 3:

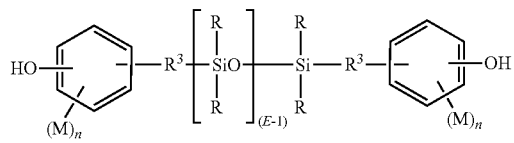

R comprises a $C_1$-$C_{30}$ aliphatic or an aromatic group or a combination of said aliphatic or said aromatic groups, $R^3$ is independently a divalent $C_{2-8}$ aliphatic group, M may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4; disclosure; and processing said polycarbonate containing material to form an article of manufacture, wherein E has an average value of 20 to 100.

In further embodiment, a method of controlling the tracking of an electrical current contains a polysiloxane block co-polycarbonate derived from at least Bisphenol-A or dihydroxy aromatic containing unit(s), and a polysiloxane bisphenol having the structure

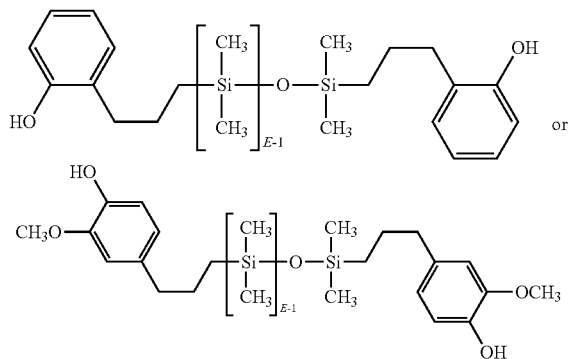

wherein E is an average value of 35 to 55; and processing said polycarbonate containing material to form an article of manufacture.

The articles of manufacture processed by this protocol include the articles of manufacture encompassed by this disclosure and other applicable articles that would be understood by one of ordinary skill in the art.

J2. Electrical Tracking Resistance/FR

As stated above, the composition comprises: at least one polycarbonate that is not a polysiloxane block co-polycarbonate; a polysiloxane block co-polycarbonate; a transition metal oxide; a brominated organic flame retardant or a halogen organic flame retardant compound; optionally 0 to 1 wt % of a fluorinated polyolefin; optionally one or more additives that impart a desired performance property; and optionally a carbon black containing material, wherein said composition has a p(FTP)V0 flammability rating>0.85 at 1.5 mm, 1.0 mm, or 0.8 mm or between 1.5 mm and 0.8 mm according to the method of UL 94, and further wherein the composition does not show tracking through at least 50 drops of a 0.1% aqueous ammonium chloride solution at 250V according to ASTM D-3638.

In another embodiment, the polycarbonate is derived from at least one or more bisphenols and one of the bisphenols is Bisphenol-A.

In another embodiment, the polysiloxane block co-polycarbonate is derived from at least Bisphenol-A or dihydroxy aromatic containing unit(s), and polysiloxane bisphenol having the structure 1,

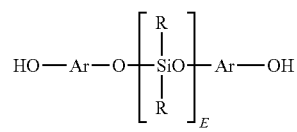

wherein R comprises a $C_1$-$C_{30}$ aliphatic or an aromatic group or a combination of said aliphatic or said aromatic groups and Ar comprises a $C_6$-$C_{30}$ aromatic group or a combination of aromatic and aliphatic groups and E has an average value of 20 to 100 or structure 2,

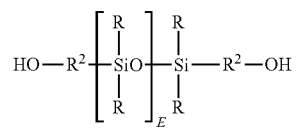

wherein R comprises a $C_1$-$C_{30}$ aliphatic or aromatic group or a combination of said aliphatic and said aromatic groups, $R^2$ comprises a $C_7$-$C_{30}$ aliphatic or a combination of aliphatic and aromatic groups and E has an average value of 20 to 100.

In another embodiment, the average value of E of structure 1 is 20 to 60.

In another embodiment, the average value of E of structure 1 is 30 to 50.

In another embodiment, the transition metal oxide is a titanium dioxide.

In another embodiment, the titanium dioxide is an inorganic coated titanium dioxide without an organic coating.

In another embodiment, the titanium dioxide is an organic coated titanium dioxide with an organic coating.

In another embodiment, the organic coating is a polysiloxane coating.

In another embodiment, the brominated organic flame retardant has a bromine content of between 0.3 and 10 wt % bromine atoms based on the total weight of the composition. In a further embodiment, the bromine content is between 1.0 and 10 wt % bromine atoms based on the weight of the total composition. In a further embodiment the bromine content is between 2 and 10 wt % based on the weight of the total composition. In a further embodiment the bromine content is between 2 and 6 wt % based on the total weight of the composition. In a further embodiment the bromine content is between 2.5 and 3 wt % based on the total weight of the composition.

In another embodiment the transitional metal oxide is chromium dioxide.

In another embodiment, the brominated organic flame retardant is at least one of the following: a brominated polycarbonate, a brominated polycarbonate oligomer, a brominated polyacrylate, a brominated polyether oligomer, a brominated polyether, and a brominated polyimide.

In another embodiment, the brominated organic flame retardant is a polycarbonate copolymer derived from at least a bisphenol-A and a 2,2'6,6'-tetrabromo bisphenol-A and wherein the average wt % of bromine atoms in the polycarbonate copolymer is 26 wt % bromine atoms based on the total weight of the polycarbonate copolymer.

In another embodiment, the fluorinated polyolefin is a fibril forming fluorinated polyolefin.

In another embodiment, the fibril forming fluorinated polyolefin is a polytetrafluoroethylene.

In another embodiment, the polytetrafluorethylene is combined with polystyrene acrylonitrile (SAN).

In another embodiment, the polysiloxane block co-polycarbonate is derived from at least Bisphenol-A or dihydroxy aromatic containing unit(s), and polysiloxane bisphenol having the structure 3:

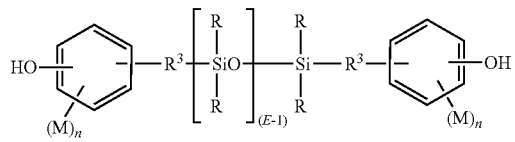

R comprises a $C_1$-$C_{30}$ aliphatic or an aromatic group or a combination of said aliphatic or said aromatic groups, $R^3$ is independently a divalent $C_{2-8}$ aliphatic group, M may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4, wherein E has an average value of 20 to 100. In a further embodiment, the transitional metal oxide is titanium dioxide with an average particle size of greater than or equal to 100 nm. In a further embodiment, the titanium dioxide has an average particle size of less than ("<") 350 nm.

In another embodiment, the composition comprises: at least one polycarbonate that is a not a polysiloxane block-co-polycarbonate; 5 to 45 wt % of a polysiloxane block co-polycarbonate; 3 to 40 wt % of a transitional metal oxide; 1 to 20 wt % or 2 to 6 wt % of bromine atoms from a brominated containing flame retardant; optionally 0 to 1 wt % of a fluorinated polyolefin; optionally one or more additives that impart a desired performance; and optionally a carbon black containing material, wherein said composition has a p(FTP) V0 flammability rating of >0.85 at 1.5 mm, 1.0 mm, or 0.8 mm or between 1.5 mm and 0.8 mm according to the method of UL 94, and further wherein the composition does not show tracking through at least 50 drops of a 0.1% aqueous ammonium chloride solution at 250V according to ASTM D-3638. In a further embodiment, the transitional metal oxide is titanium dioxide or other transition metal oxides encompassed by this disclosure. In a further embodiment, the composition comprises: the polysiloxane block co-polycarbonate is derived from at least Bisphenol-A or dihydroxy aromatic containing unit(s) and polysiloxane bisphenol having the structure 3:

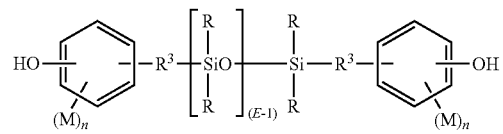

R comprises a $C_1$-$C_{30}$ aliphatic or an aromatic group or a combination of said aliphatic or said aromatic groups, $R^3$ is independently a divalent $C_{2-8}$ aliphatic group, M may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4, wherein E has an average value of 20 to 100. In a further embodiment, the transitional metal oxide is titanium dioxide dioxide or other transition metal oxides encompassed by this disclosure.

In a further embodiment, the polysiloxane block co-polycarbonate is derived from at least Bisphenol-A or dihydroxy aromatic containing unit(s), and a polysiloxane bisphenol having the structure

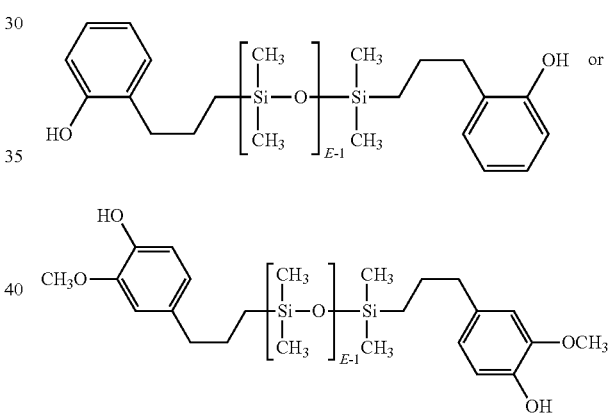

wherein E is average value of 35 to 55.

In yet a further embodiment, the composition has 7.5 to 25 wt % of a polysiloxane block co-polycarbonate; 5 to 15 wt % of titanium dioxide; optionally 2 to 6 wt % of bromine atoms from a brominated organic flame retardant or a halogen organic flame retardant compound; and optionally 0.1 to 0.5 wt % of a fluorinated polyolefin.

Compositions encompassed by this disclosure can include carbon black.

In one embodiment, the wt % of the carbon black in the composition is less than 1 wt % based on the total weight of the composition.

In another embodiment, the wt % of the carbon black in the composition is less than 0.5 wt % based on the total weight of the composition.

The compositions encompassed by this disclosure can be used to make various articles of manufacture.

In one embodiment, the article of manufacture contains at least one polycarbonate that is a not a polysiloxane block-co-polycarbonate; a polysiloxane block co-polycarbonate; a transition metal oxide; a brominated organic flame retardant or halogen organic flame retardant; optionally a fluorinated polyolefin; optionally one or more additives that impart a desired performance property; and optionally a carbon black containing material, wherein said composition has a p(FTP) V0 flammability rating>0.85 at 1.5 mm, 1.0 mm, or 0.8 mm or between 1.5 mm and 0.8 mm according to the method of UL 94, and further wherein the composition does not show tracking through at least 50 drops of a 0.1% aqueous ammonium chloride solution at 250V according to ASTM D-3638. In a further embodiment, the transition metal oxide is titanium dioxide or other transition metal oxides encompassed by this disclosure.

In another embodiment, the article of manufacture contains a polysiloxane block co-polycarbonate that is derived from at least Bisphenol-A or dihydroxy aromatic containing unit(s), and polysiloxane bisphenol having the structure 1,

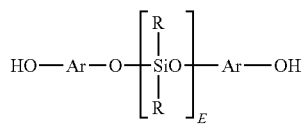

wherein R comprises a $C_1$-$C_{30}$ aliphatic or an aromatic group or a combination of said aliphatic or said aromatic groups and Ar comprises a $C_6$-$C_{30}$ aromatic group or a combination of aromatic and aliphatic groups and E has an average value of 20 to 100.

or structure 2,

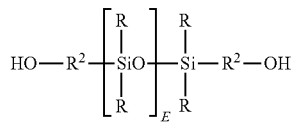

wherein R comprises a $C_1$-$C_{30}$ aliphatic or aromatic group or a combination of said aliphatic and said aromatic groups, R2 comprises a $C_7$-$C_{30}$ aliphatic or a combination of aliphatic and aromatic groups and E has an average value of 20 to 100. In a further embodiment, the transition metal oxide is titanium dioxide or other transition metal oxides encompassed by this disclosure.

In another embodiment, the article of manufacture contains composition comprising: at least one a polycarbonate that is a not a polysiloxane block-co-polycarbonate; 5 to 45 wt % of a polysiloxane block co-polycarbonate; 3 to 40 wt % of a transitional metal oxide; a brominated organic flame retardant or a halogen organic flame retardant compound; optionally a fluorinated polyolefin; optionally one or more additives that impart a desired performance property; and optionally a carbon black containing material, wherein said composition has a p(FTP)V0 flammability rating>0.85 at 1.5 mm, 1.0 mm, or 0.8 mm or between 1.5 mm and 0.8 mm according to the method of UL 94, and further wherein the composition does not show tracking through at least 50 drops of a 0.1% aqueous ammonium chloride solution at 250V according to ASTM D-3638.

In a further embodiment, the article of manufacture contains a polysiloxane block co-polycarbonate is derived from at least Bisphenol-A or dihydroxy aromatic containing unit(s) and polysiloxane bisphenol having the structure 3:

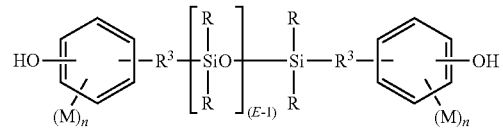

R comprises a $C_1$-$C_{30}$ aliphatic or an aromatic group or a combination of said aliphatic or said aromatic groups, $R^3$ is independently a divalent $C_{2-8}$ aliphatic group, M may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4, wherein E has an average value of 20 to 100.

In a further embodiment, the article of manufacture contains a polysiloxane block co-polycarbonate derived from at least Bisphenol-A or dihydroxy aromatic containing unit(s), and a polysiloxane bisphenol having the structure

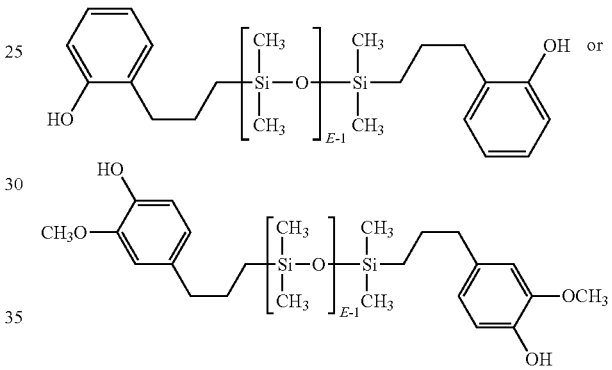

wherein E is average value of 35 to 55.

In another embodiment, the article of manufacture is an insulating material.

In another embodiment, the article of manufacture is selected from at least one of the following: a solar apparatus, an electrical junction box, an electrical connector, an electrical vehicle charger, an outdoor electrical enclosure, a smart meter enclosure, and a smart grid power node, PV frame, and MCB applications. The compositions of this disclosure can be embodied in at least one of these apparatuses.

In another embodiment, the article of manufacture is a junction box. The compositions of this disclosure can be embodied in this apparatus.

A method of controlling the tracking of an electrical current of an article of manufacture containing a polycarbonate containing material is encompassed by this disclosure.

In one embodiment, a method of controlling the tracking of an electrical current of an article of manufacture containing a polycarbonate containing material comprises providing at least one polycarbonate that is a not a polysiloxane block-co-polycarbonate; a polysiloxane block co-polycarbonate; a transition metal oxide; a brominated organic flame retardant or a halogen organic flame retardant compound; optionally a fluorinated polyolefin; optionally one or more additives that impart a desired performance property; and optionally a carbon black containing material, wherein said composition has a p(FTP)V0 flammability rating>0.85 at 1.5 mm, 1.0 mm, or 0.8 mm or between 1.5 mm and 0.8 mm according to the method of UL 94, and further wherein the composition does not show tracking through at least 50 drops of a 0.1% aqueous ammonium chloride solution at 250V according to ASTM D-3638; and processing said polycarbonate containing material to form an article of manufacture.

In another embodiment, a method of controlling the tracking of an electrical current of an article of manufacture containing a polycarbonate containing material comprises providing a polysiloxane block co-polycarbonate that is derived from at least Bisphenol-A or dihydroxy aromatic containing unit(s), and polysiloxane bisphenol having the structure 1,

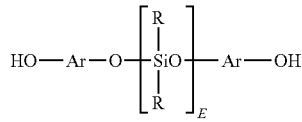

wherein R comprises a $C_1$-$C_{30}$ aliphatic or an aromatic group or a combination of said aliphatic or said aromatic groups and Ar comprises a $C_6$-$C_{30}$ aromatic group or a combination of aromatic and aliphatic groups and E has an average value of 20 to 100.

or structure 2,

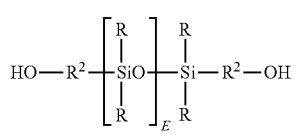

wherein R comprises a $C_1$-$C_{30}$ aliphatic or aromatic group or a combination of said aliphatic and said aromatic groups, R2 comprises a $C_7$-$C_{30}$ aliphatic or a combination of aliphatic and aromatic groups and E has an average value of 20 to 100; disclosure; and processing said polycarbonate containing material to form an article of manufacture. In a further embodiment, the transition metal oxide is titanium dioxide or other transition metal oxides encompassed by this disclosure.

In another embodiment, a method of controlling the tracking of an electrical current of an article of manufacture containing a polycarbonate containing material comprises providing a polycarbonate that is a not a polysiloxane block-co-polycarbonate; 5 to 45 wt % of a polysiloxane block co-polycarbonate; 3 to 40 wt % of a transitional metal oxide; a brominated organic flame retardant or a halogen containing flame retardant; optionally a fluorinated polyolefin; optionally one or more additives that impart a desired performance property; and optionally a carbon black containing material, wherein said composition has a p(FTP)V0 flammability rating>0.85 at 1.5 mm, 1.0 mm, or 0.8 mm or between 1.5 mm and 0.8 mm according to the method of UL 94, and further wherein the composition does not show tracking through at least 50 drops of a 0.1% aqueous ammonium chloride solution at 250V according to ASTM D-3638; and processing said polycarbonate containing material to form an article of manufacture.

In further embodiment, a method of controlling the tracking of an electrical current contains a polysiloxane block co-polycarbonate that is derived from at least Bisphenol-A or dihydroxy aromatic containing unit(s) and polysiloxane bisphenol having the structure 3:

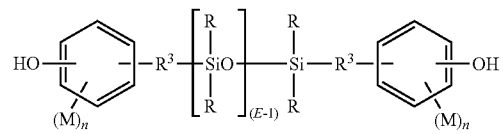

R comprises a $C_1$-$C_{30}$ aliphatic or an aromatic group or a combination of said aliphatic or said aromatic groups, $R^3$ is independently a divalent $C_{2-8}$ aliphatic group, M may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4; disclosure, wherein E has an average value of 20 to 100; and processing said polycarbonate containing material to form an article of manufacture.

In another embodiment, a method of controlling the tracking of an electrical current of an article of manufacture contains a polysiloxane block co-polycarbonate derived from at least Bisphenol-A or dihydroxy aromatic containing unit(s), and a polysiloxane bisphenol having the structure

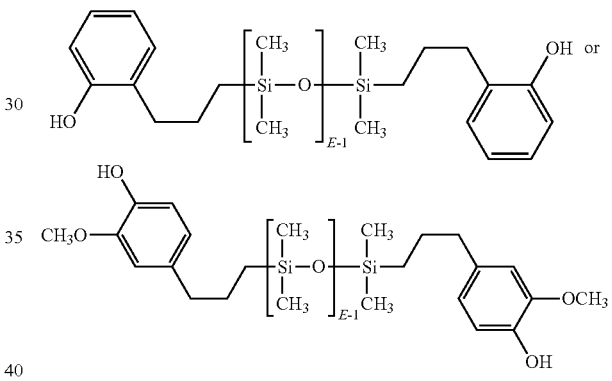

wherein E is an average value of 35 to 55; and processing said polycarbonate containing material to form an article of manufacture.

The articles of manufacture processed by this protocol include the articles of manufacture encompassed by this disclosure and other applicable articles that would be understood by one of ordinary skill in the art.

J3. Electrical Tracking Resistance/FR/Impact

As stated above, the composition comprises: at least one polycarbonate that is not a polysiloxane block co-polycarbonate; a polysiloxane block co-polycarbonate; a transition metal oxide; a brominated organic flame retardant or a halogen organic flame retardant compound; optionally 0 to 1 wt % of a fluorinated polyolefin; optionally one or more additives that impart a desired performance property; and optionally a carbon black containing material, wherein the composition has a notched izod impact at −30° C. of at least 35 kJ/m² at a thickness of 3.0 mm according to ISO-180 standard with a 5.5 J hammer and wherein the composition has a p(FTP) V0 flammability rating if at least 0.85 at 0.8 mm, 1.0 mm, and 1.5 mm according to the method of UL 94, and further wherein the composition does not show tracking through at least 50 drops of a 0.1% aqueous ammonium chloride solution at 250V according to ASTM D-3638.

In another embodiment, the polycarbonate is derived from at least one or more bisphenols and one of the bisphenols is Bisphenol-A.

In another embodiment, the polysiloxane block co-polycarbonate is derived from at least Bisphenol-A or dihydroxy aromatic containing unit(s), and polysiloxane bisphenol having the structure 1,

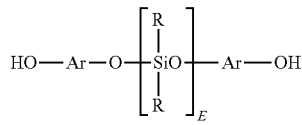

wherein R comprises a $C_1$-$C_{30}$ aliphatic or an aromatic group or a combination of said aliphatic or said aromatic groups and Ar comprises a $C_6$-$C_{30}$ aromatic group or a combination of aromatic and aliphatic groups and E has an average value of 20 to 100 or structure 2,

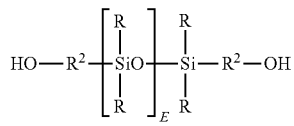

wherein R comprises a $C_1$-$C_{30}$ aliphatic or aromatic group or a combination of said aliphatic and said aromatic groups, R2 comprises a $C_7$-$C_{30}$ aliphatic or a combination of aliphatic and aromatic groups and E has an average value of 20 to 100.

In another embodiment, the average value of E of structure 1 of 20 to 60.

In another embodiment, the average value of E of structure 1 of 30 to 50.

In another embodiment, the transition metal oxide is a titanium dioxide.

In another embodiment, the titanium dioxide is an inorganic coated titanium dioxide without an organic coating.

In another embodiment, the titanium dioxide is an organic coated titanium dioxide with an organic coating.

In another embodiment, the organic coating is a polysiloxane coating.

In another embodiment, the brominated organic flame retardant has a bromine content of between 0.3 and 10 wt % bromine atoms based on the total weight of the composition. In a further embodiment, the bromine content is between 1.0 and 10 wt % bromine atoms based on the weight of the total composition. In a further embodiment the bromine content is between 2 and 10 wt % based on the weight of the total composition. In a further embodiment the bromine content is between 2 and 6 wt % based on the total weight of the composition. In a further embodiment the bromine content is between 2.5 and 3 wt % based on the total weight of the composition.

In another embodiment the transitional metal oxide is chromium dioxide.

In another embodiment, the brominated organic flame retardant is at least one of the following: a brominated polycarbonate, a brominated polycarbonate oligomer, a brominated acrylate, a brominated polyether, a brominated polyether oligomer, and a brominated phthalimide.

In another embodiment, the brominated organic flame retardant is a polycarbonate copolymer derived from at least a bisphenol-A and a 2,2',6,6'-tetrabromo bisphenol-A and wherein the average wt % of bromine atoms in the polycarbonate copolymer is 26 wt % bromine atoms based on the total weight of the polycarbonate copolymer.

In another embodiment, the fluorinated polyolefin is a fibril forming fluorinated polyolefin.

In another embodiment, the fibril forming fluorinated polyolefin is a polytetrafluoroethylene.

In another embodiment, the polytetrafluorethylene is combined with polystyrene acrylonitrile (SAN).

In another embodiment, the polysiloxane block co-polycarbonate is derived from at least Bisphenol-A or dihydroxy aromatic containing unit(s), and polysiloxane bisphenol having the structure 3:

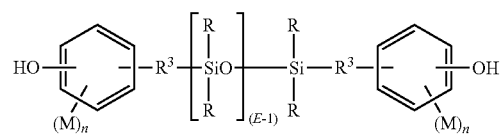

R comprises a $C_1$-$C_{30}$ aliphatic or an aromatic group or a combination of said aliphatic or said aromatic groups, $R^3$ is independently a divalent $C_{2-8}$ aliphatic group, M may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4, wherein E has an average value of 20 to 100. In a further embodiment, the transitional metal oxide is titanium dioxide with an average particle size of greater than or equal to 100 nm. In a further embodiment, transitional metal oxide is titanium dioxide with an average particle size of <350 nm.

In another embodiment, the composition comprises: at least one polycarbonate that is a not a polysiloxane block-co-polycarbonate; 5 to 45 wt % of a polysiloxane block co-polycarbonate; 3 to 40 wt % of a transitional metal oxide; 2 wt % to 6 wt % of bromine atoms from a brominated organic flame retardant; optionally 0 to 1 wt % of a fluorinated polyolefin; optionally one or more additives that impart a desired performance property; and optionally a carbon black containing material, wherein the composition has a notched izod impact at −30° C. of at least 35 kJ/m$^2$ at a thickness of 3.0 mm according to ISO-180 standard with a 5.5 J hammer and wherein the composition has a p(FTP) V0 flammability rating if at least 0.85 at 0.8 mm, 1.0 mm, and 1.5 mm according to the method of UL 94, and further wherein the composition does not show tracking through at least 50 drops of a 0.1% aqueous ammonium chloride solution at 250V according to ASTM D-3638. In a further embodiment, the transitional metal oxide is titanium dioxide or other transition metal oxides encompassed by this disclosure.

In a further embodiment, the polysiloxane block co-polycarbonate is derived from at least Bisphenol-A or dihydroxy aromatic containing unit(s) and polysiloxane bisphenol having the structure 3:

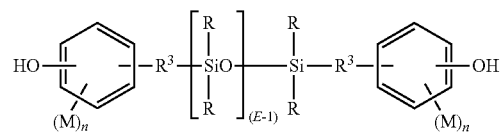

R comprises a $C_1$-$C_{30}$ aliphatic or an aromatic group or a combination of said aliphatic or said aromatic groups, $R^3$ is independently a divalent $C_{2-8}$ aliphatic group, M may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4, wherein E has an average value of 20 to 100. In a further embodiment, the transitional metal oxide is titanium dioxide or other transition metal oxides encompassed by this disclosure.

In a further embodiment, the polysiloxane block co-polycarbonate is derived from at least Bisphenol-A or dihydroxy aromatic containing unit(s), and a polysiloxane bisphenol having the structure

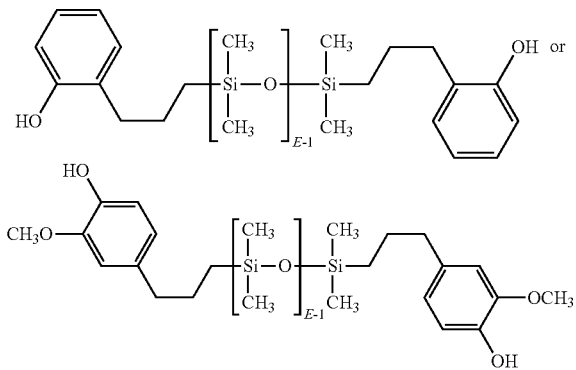

wherein E is 35-55.

In another embodiment, the composition has 7.5 to 25 wt % of a polysiloxane block co-polycarbonate; 5 to 15 wt % of titanium dioxide; optionally 2 to 6 wt % of a brominated atoms or a halogen organic flame retardant compound; and optionally 0.1 to 0.5 wt % of a fluorinated polyolefin.

Compositions encompassed by this disclosure can include carbon black.

In another embodiment, the wt % of the carbon black in the composition is less than 1 wt % based on the total weight of the composition.

In another embodiment, the wt % of the carbon black in the composition is less than 0.5 wt % based on the total weight of the composition.

The compositions encompassed by this disclosure can be used to make various articles of manufacture.

In one embodiment, the article of manufacture contains a polycarbonate that is a not a polysiloxane block-co-polycarbonate; a polysiloxane block co-polycarbonate; a transition metal oxide; a brominated organic flame retardant or a halogen containing flame retardant; optionally a fluorinated polyolefin; optionally one or more additives that impart a desired performance property; and optionally a carbon black containing material, wherein the composition has a notched izod impact at −30° C. of at least 35 kJ/m² at a thickness of 3.0 mm according to ISO-180 standard with a 5.5 J hammer and wherein the composition has a p(FTP) V0 flammability rating if at least 0.85 at 0.8 mm, 1.0 mm, and 1.5 mm according to the method of UL 94, and further wherein the composition does not show tracking through at least 50 drops of a 0.1% aqueous ammonium chloride solution at 250V according to ASTM D-3638. In a further embodiment, the transition metal oxide is titanium dioxide or other transition metal oxides encompassed by this disclosure.

In another embodiment, the article of manufacture contains a polysiloxane block co-polycarbonate that is derived from at least Bisphenol-A or dihydroxy aromatic containing unit(s), and polysiloxane bisphenol having the structure 1,

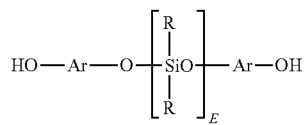

wherein R comprises a $C_1$-$C_{30}$ aliphatic or an aromatic group or a combination of said aliphatic or said aromatic groups and Ar comprises a $C_6$-$C_{30}$ aromatic group or a combination of aromatic and aliphatic groups and E has an average value of 20 to 100.

or structure 2,

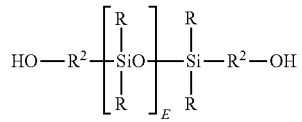

wherein R comprises a $C_1$-$C_{30}$ aliphatic or aromatic group or a combination of said aliphatic and said aromatic groups, R2 comprises a $C_7$-$C_{30}$ aliphatic or a combination of aliphatic and aromatic groups and E has an average value of 20 to 100. In a further embodiment, the transition metal oxide is titanium dioxide or other transition metal oxides encompassed by this disclosure.

In another embodiment, the article of manufacture contains composition comprising: at least one a polycarbonate that is a not a polysiloxane block-co-polycarbonate; 5 to 45 wt % of a polysiloxane block co-polycarbonate; 3 to 40 wt % of a transitional metal oxide; a brominated organic flame retardant or a halogen organic flame retardant; optionally a fluorinated polyolefin; optionally one or more additives; and optionally a carbon black containing material, wherein the composition has a notched izod impact at −30° C. of at least 35 kJ/m² at a thickness of 3.0 mm according to ISO-180 standard with a 5.5 J hammer and wherein the composition has a p(FTP) V0 flammability rating if at least 0.85 at 0.8 mm, 1.0 mm, and 1.5 mm according to the method of UL 94, and further wherein the composition does not show tracking through at least 50 drops of a 0.1% aqueous ammonium chloride solution at 250V according to ASTM D-3638.

In a further embodiment, the article of manufacture contains a polysiloxane block co-polycarbonate that is derived from at least Bisphenol-A or dihydroxy aromatic containing unit(s) and polysiloxane bisphenol having the structure 3:

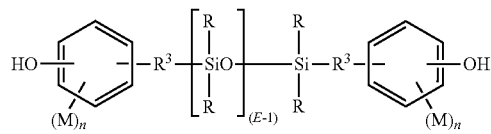

R comprises a $C_1$-$C_{30}$ aliphatic or an aromatic group or a combination of said aliphatic or said aromatic groups, $R^3$ is independently a divalent $C_{2-8}$ aliphatic group, M may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4, wherein E has an average value of 20 to 100.

In a further embodiment, the article of manufacture contains a polysiloxane block co-polycarbonate derived from at least Bisphenol-A or dihydroxy aromatic containing unit(s), and a polysiloxane bisphenol having the structure

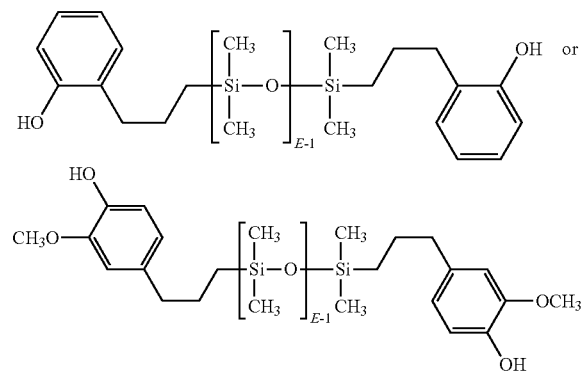

wherein E is an average value of 35 to 55.

In another embodiment, the article of manufacture is an insulating material.

In another embodiment, the article of manufacture is selected from at least one of the following: a solar apparatus, an electrical junction box, an electrical connector, an electrical vehicle charger, an outdoor electrical enclosure, a smart meter enclosure, a smart grid power node, PV frames, and MCBs. The compositions of this disclosure can be embodied in at least one of these apparatuses.

In another embodiment, the article of manufacture is a junction box. The compositions of this disclosure can be embodied in this apparatus.

A method of controlling the tracking of an electrical current of an article of manufacture containing a polycarbonate containing material is encompassed by this disclosure.

In one embodiment, a method of controlling the tracking of an electrical current of an article of manufacture containing a polycarbonate containing material comprises providing at least one polycarbonate that is a not a polysiloxane block-co-polycarbonate; a polysiloxane block co-polycarbonate; a transition metal oxide; a brominated organic flame retardant or a halogen containing flame retardant; optionally a fluorinated polyolefin; optionally one or more additives that impart a desired performance property; and optionally a carbon black containing material, wherein the composition has a notched izod impact at −30° C. of at least 35 kJ/m² at a thickness of 3.0 mm according to ISO-180 standard with a 5.5 J hammer and wherein the composition has a p(FTP) V0 flammability rating if at least 0.85 at 0.8 mm, 1.0 mm, and 1.5 mm according to the method of UL 94, and further wherein the composition does not show tracking through at least 50 drops of a 0.1% aqueous ammonium chloride solution at 250V according to ASTM D-3638.

In a further embodiment, a method of controlling the tracking of an electrical current of an article of manufacture contains a polysiloxane block co-polycarbonate that is derived from at least Bisphenol-A or dihydroxy aromatic containing unit(s), and polysiloxane bisphenol having the structure 1,

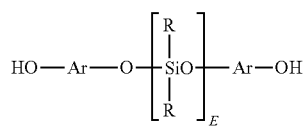

wherein R comprises a $C_1$-$C_{30}$ aliphatic or an aromatic group or a combination of said aliphatic or said aromatic groups and Ar comprises a $C_6$-$C_{30}$ aromatic group or a combination of aromatic and aliphatic groups and E has an average value of 20 to 100.

or structure 2,

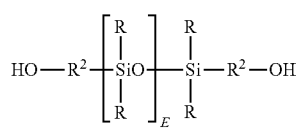

wherein R comprises a $C_1$-$C_{30}$ aliphatic or aromatic group or a combination of said aliphatic and said aromatic groups, R2 comprises a $C_7$-$C_{30}$ aliphatic or a combination of aliphatic and aromatic groups and E has an average value of 20 to 100; and processing said polycarbonate containing material to form an article of manufacture. In a further embodiment, the transition metal oxide is titanium dioxide or other transition metal oxides encompassed by this disclosure.

In a further embodiment, a method of controlling the tracking of an electrical current of an article of manufacture containing a polycarbonate containing material comprises providing at least one polycarbonate that is a not a polysiloxane block-co-polycarbonate; 5 to 45 wt % of a polysiloxane block co-polycarbonate; 3 to 40 wt % of a transitional metal oxide; a brominated organic flame retardant or a halogen organic flame retardant; optionally a fluorinated polyolefin; optionally one or more additives; and optionally a carbon black containing material, wherein the composition has a notched izod impact at −30° C. of at least 35 kJ/m² at a thickness of 3.0 mm according to ISO-180 standard with a 5.5 J hammer and wherein the composition has a p(FTP) V0 flammability rating if at least 0.85 at 0.8 mm, 1.0 mm, and 1.5 mm according to the method of UL 94, and further wherein the composition does not show tracking through at least 50 drops of a 0.1% aqueous ammonium chloride solution at 250V according to ASTM D-3638.

In a further embodiment, a method of controlling the tracking of an electrical current of an article of manufacture contains a polysiloxane block co-polycarbonate is derived from at least Bisphenol-A or dihydroxy aromatic containing unit(s) and polysiloxane bisphenol having the structure 3:

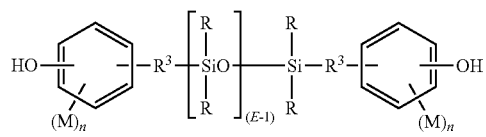

R comprises a $C_1$-$C_{30}$ aliphatic or an aromatic group or a combination of said aliphatic or said aromatic groups, $R^3$ is independently a divalent $C_{2-8}$ aliphatic group, M may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4; disclosure, wherein E has an average value of 20 to 100; and processing said polycarbonate containing material to form an article of manufacture.

In a further embodiment, a method of controlling the tracking of an electrical current of an article of manufacture contains a polysiloxane block co-polycarbonate derived from at least Bisphenol-A or dihydroxy aromatic containing unit(s), and a polysiloxane bisphenol having the structure

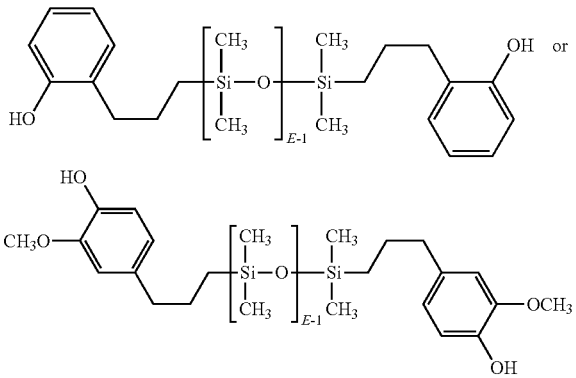

wherein E is an average value of 35 to 55; and processing said polycarbonate containing material to form an article of manufacture.

The articles of manufacture processed by this protocol include the articles of manufacture encompassed by this disclosure and other applicable articles that would be understood by one of ordinary skill in the art.

The present invention is more particularly described in the following description and examples that are intended to be illustrative only since numerous modifications and variations therein will be apparent to those skilled in the art. As used in the specification and in the claims, the term "comprising" may include the embodiments "consisting of" and "consisting essentially of."

All ranges disclosed herein are inclusive of the endpoints and are independently combinable. The endpoints of the ranges and any values disclosed herein are not limited to the precise range or value; they are sufficiently imprecise to include values approximating these ranges and/or values. Ranges articulated within this disclosure, e.g. numerics/values, shall include disclosure for possession purposes and claim purposes of the individual points within the range, sub-ranges, and combinations thereof. As an example, for the recitation of numeric ranges herein, each intervening number there between with the same degree of precision is explicitly contemplated—for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Various combinations of elements of this disclosure are encompassed by this invention, e.g. combinations of elements from dependent claims that depend upon the same independent claim.

The invention is further illustrated by the following non-limiting examples.

EXAMPLES

Protocols

Electrical Tracking Resistance:

Electrical tracking resistance tests were performed on a 3 mm square plaque (6×6 cm) in accordance with the ASTM D-3638. The test can be started at any given voltage. At each voltage 5 specimens are tested and the average number of drops is recorded. The test is performed at (at least) 4 different voltages, where there should be at least two data points with an average number of drops higher than 50 and two data points with an average number of drops lower than 50. A voltage extrapolation to 50 drops is made, as shown in figure A.2, and based on this voltage ($V_{ASTM}$) a PLC class is assigned. This assignment is done according to the table below.

| $V_{ASTM}$ | PLC |
|---|---|
| <100 | 5 |
| 100-174 | 4 |
| 175-249 | 3 |
| 250-399 | 2 |
| 400-599 | 1 |
| ≥600 | 0 |

A screening method was employed to predict the CTI-2 performance for most of the samples described in this application. The screening method employed the ASTM D-3638 method but testing was conducted at only one voltage, 250 V. The number of drops until failure was recorded and no more than 100 drops were applied. A prediction of a CTI-2 rating for a sample was based on reaching at least 50 drops of the electrolyte solution before failure at 250 V. A prediction of not receiving a CTI rating was based on failure before reaching 50 drops of the electrolyte solution at 250 V. The screening method for predicting CTI-2 rating is identified throughout the disclosure as the CTI test.

Impact Measurements: INI Method

ISO Izod impact measurements were performed on notched 3 mm ISO bars at various temperatures, in accordance with the ISO-180 standard with a 5.5 J hammer Ductility was expressed as the percentage of bars that showed ductile. The polycarbonate test bar has undergone ductile failure in a notched izod test if, after impact, the bar remains as a single piece, with the two ends of the bar attached and rigid (i.e. self supporting). A test bar has undergone brittle failure if after impact either the two ends of the bar have broken into two separate pieces or if they are attached by only a thin, flexible connection of plastic.

MVR:

Melt volume rates were measured in accordance with the 150-1133 standard at 300° C. under a load of 1.2 kg with residence time of 5 minutes or 15 minutes (dwell-MVR). The granules were dried for 2 hours at 120° C.

Flamability Testing:

UL 94 Testing:

Flammability tests were performed following the procedure of Underwriter's Laboratory Bulletin 94 entitled "Tests for Flammability of Plastic Materials, UL94." Several ratings can be applied based on the rate of burning, time to extinguish, ability to resist dripping, and whether or not drips are burning. According to this procedure, materials can be classified as UL94 HB, V0, V1, V2, on the basis of the test results obtained for five samples.

HB: In a 5-inch sample, placed so that the long axis of the sample is horizontal to the flame, the rate of burn of the sample is less than 3 inches per minute, and the flame is extinguished before 4 inches of sample are burned.

V0: In a sample placed so that its long axis is 180 degrees to the flame, the average period of flaming and/or smoldering after removing the igniting flame does not exceed ten seconds and none of the vertically placed samples produces drips of burning particles that ignite absorbent cotton. Five bar flame out time (FOT) is the sum of the flame out time for five bars, each lit twice for a maximum flame out time of 50 seconds.

V1: In a sample placed so that its long axis is 180 degrees to the flame, the average period of flaming and/or smoldering after removing the igniting flame does not exceed 30 seconds and none of the vertically placed samples produces drips of burning particles that ignite absorbent cotton. Five bar flame out time is the sum of the flame out time for five bars, each lit twice for a maximum flame out time of 250 seconds.

V2: In a sample placed so that its long axis is 180 degrees to the flame, the average period of flaming and/or smoldering after removing the igniting flame does not exceed 30 seconds, but the vertically placed samples produce drips of burning particles that ignite cotton. Five bar flame out time is the sum of the flame out time for five bars, each lit twice for a maximum flame out time of 250 seconds.

A summary of the UL Flame rating criteria is shown below:

|  | $t_1$ and $t_2$ | 5-bar FOT | burning drips |
|---|---|---|---|
| V0 | <10 | <50 | no |
| V1 | <30 | <250 | no |
| V2 | <30 | <250 | yes |
| N.R. (no rating) | >30 | >250 |  |

The UL rating was assigned based on the testing of 2 sets of 5 bars. The best rating of the two sets 5 bars was selected as the rating of the sample in case of a discrepancy.

2. UL 94 VO p(FTP) Flame Testing Procedure:

Statistical flammability testing, UL 94 VO p(FTP), was conducted using the standard Underwriters Laboratory UL 94 test method (2 day conditioning), except that 10 bars rather than the usual 5 bars were tested. Specimens are to be pre-conditioned in an air-circulating oven for 48 hours at 23±1° C. and then cooled in the desiccator for at least 4 hours at room temperature, prior to testing. Once removed from the desiccator, specimens shall be tested within 30 minutes. The data was analyzed by calculation of the average flame out time, standard deviation of the flame out time and the total number of drips. Statistical methods were used to convert the data to a probability that a specific formulation would achieve a first time VO pass or "UL 94 VO p(FTP)" in the standard UL 94 testing of 5 bars. Preferably UL 94 VO p(FTP) values will be 1 or very close to 1 for high confidence that a sample formulation would achieve a VO rating in UL 94 testing. In some embodiments a UL 94 VO p(FTP) value below 0.85 was considered too for a sample formulation was considered too low to predict a UL 94 rating of V0 for that formulation. In some embodiments a UL VO p(FTP) rating below 0.70 was considered too low to predict a UL 94 rating of V0 for that formulation. Unless otherwise note all p(FTP) ratings were targeted for a high probability of a UL 94 VO pass at 1.5 mm part thickness.

Materials:

All materials used can be found in the tables below which lists the description, manufacturer and tradename. Weight-averaged molecular weight values reported in the Tables below were obtained by gel permeation chromatography (GPC), using a crosslinked styrene-divinylbenzene column and calibrated to polycarbonate references. GPC samples are prepared at a concentration of about 1 mg/ml, and are eluted at a flow rate of about 1.5 ml/min using methylene chloride as the solvent.

The Table below provides a general description of the materials used in this disclosure. Further details about titanium dioxide and brominated FR additives are listed in specific sections in the PROPERTY PERFORMANCE EXAMPLE Sections.

| PC 1 | BPA polycarbonate (Mw = 30,500*) | SABIC-IP | Lexan 105 |
|---|---|---|---|
| PC 2 | BPA polycarbonate (Mw = 21,800*) | SABIC-IP | Lexan 175 |
| EXL | Siloxane block co-polycarbonate (20% siloxane, Mw = 30,000*) | SABIC-IP | opaque EXL |
| Clear EXL | Siloxane block co-polycarbonate (6 wt % siloxane, Mw = 30,000) |  |  |
| Carbon Black | Powder | Degussa AG | Printex 85 |
| Brominated PC | BPA-2,6 Tetrabromo BPA copolycarbonate (26 wt % Bromine atoms; Mw = 23,600) | SABIC-IP | Lexan 105B |
| KSS | Potassium diphenylsulphon-3-sulphonate | Arichem LLC | KSS |
| Rimar salt | Potassium perfluorobutane-sulfonate | Lanxess | Bayowet C4 |
| TSAN | SAN encapsulated PTFE | SABIC-IP | TSAN |
| PETS | Pentaerythritol tetrastearate | Faci | PETS G |
| UV stabilizer | 2-(2 hydroxy-3,5 dicumyl) benzotriazole | Ciba | Tinuvin 234 |
| HEAT STABILIZER | Tris(2,4-di-tert-butylphenyl)-phosphate | Ciba | Irgafos 168 |

*Molecular weights in g/mol, measured by GPC according to a PC standard.

Compounding Conditions:

Extrusion for all blends was performed according to the extrusion profile indicated in the table below. All powders, including mineral fillers and acid (if present), were blended using a paint shaker and fed through one feeder. The remaining PC was fed through a second feeder. In case BPADP was used, this was fed as a masterbatch, blended with pure LX-PC pellets in a separate feeder.

Molding Conditions:

Molding of UL bars in the table below. All other parts were molded on Engel® 75T or 45T molding machine, according to profile M1. For the 1 mm, 1.2 mm and 1.5 mm UL bars an end-gated tools were used, while for the 0.8 mm UL bars a side-gated tool was used.

TABLE E.2

The compounding profile used in this report
Extrusion profile

| Profile | — | E1 |
|---|---|---|
| Extrusion line | — | B25 |
| Temp. feed zone | ° C. | 40 |
| Temp. zone 1 | ° C. | 200 |

TABLE E.2-continued

The compounding profile used in this report
Extrusion profile

| Temp. zone 2 | ° C. | 250 |
|---|---|---|
| Temp. zone 3 | ° C. | 270 |
| Temp. zone 4 | ° C. | 285 |
| Temp. zone 5 | ° C. | 285 |
| Temp. zone 6 | ° C. | 285 |
| Temp. zone 7 | ° C. | 285 |
| Temp. zone 8 | ° C. | 285 |
| Temp. zone 9 | ° C. | 285 |
| Temp. die | ° C. | — |
| Screw speed | rpm | 300 |
| Vacuum | bar | 0.7 |

TABLE E.3

The molding profiles used for insert tool molding described in this report
Molding profiles

| Profile | | M1 | M2 |
|---|---|---|---|
| Molding machine | — | E45 or E75 | E75 |
| Drying time | Hr. | 2 | 2 |
| Drying temp. | ° C. | 120 | 120 |
| Hopper temp. | ° C. | 40 | 40 |
| Temp. zone 1 | ° C. | 280 | 270 |
| Temp. zone 2 | ° C. | 290 | 280 |
| Temp. zone 3 | ° C. | 300 | 290 |
| Nozzle temp. | ° C. | 295 | 285 |
| Mold temp. | ° C. | 100 | 100 |
| Back pressure | bar | 5 | 5 |

Property Performance Examples:
1. Electrical Tracking Resistance/Impact
1A. Influence of Titanium Dioxide and Polysiloxane Block Co-Polycarbonate Data Table 1 illustrates the affect of titanium dioxide on the impact and electrical tracking resistance when titanium dioxide is present in the formulation. The type of titanium dioxide used was KRONOS 2450 and is a siloxane coated titanium dioxide.

DATA TABLE 1

| | | | | 1 | 2 | 3 | 4 | 5 | 6 |
|---|---|---|---|---|---|---|---|---|---|
| | PC 1 | | % | 65.85 | 60.85 | 55.85 | 58.35 | 53.35 | 48.35 |
| | PC 2 | | | 33.6 | 33.6 | 33.6 | 33.6 | 33.6 | 33.6 |
| | EXL | | % | | | | 7.5 | 7.5 | 7.5 |
| | TiO2 type 1 | | % | | 5 | 10 | | 5 | 10 |
| | TSAN | | % | 0.3 | 0.3 | 0.3 | 0.3 | 0.3 | 0.3 |
| | Additives | | | 0.25 | 0.25 | 0.25 | 0.25 | 0.25 | 0.25 |
| MVR | | 300° C., 1.2 kg, 5' | cm$^3$/10 min | 8.7 | 14.3 | 23.1 | 7.4 | 8.5 | 9.0 |
| 3 mm INI | Impact | 23° C. | kJ/m$^2$ | 73 | 10 | 7 | 71 | 68 | 62 |
| | Impact | −30° C. | kJ/m$^2$ | 10 | 9 | 7 | 18 | 37 | 51 |
| | Ductility | 23° C. | % | 100 | 0 | 0 | 100 | 100 | 100 |
| | Ductility | −30° C. | % | 0 | 0 | 0 | 0 | 30 | 100 |
| UL94 V0 | FOT | 1.5 mm | sec | 48 | 120 | 204 | 27 | 319 | 400 |
| | pFTP (V0) | 1.5 mm | — | 0.12 | 0.00 | 0.00 | 0.73 | 0.00 | 0.00 |
| CTI Test | number of drops | 250 V | — | 100 | 100 | 100 | 62 | 100 | 100 |

| | | | | 7 | 8 | 9 | 10 | 11 | 12 |
|---|---|---|---|---|---|---|---|---|---|
| | PC 1 | | % | 53.35 | 48.35 | 43.35 | 48.35 | 43.35 | 38.35 |
| | PC 2 | | | 33.6 | 33.6 | 33.6 | 33.6 | 33.6 | 33.6 |
| | EXL | | % | 12.5 | 12.5 | 12.5 | 17.5 | 17.5 | 17.5 |
| | TiO2 type 1 | | % | | 5 | 10 | | 5 | 10 |
| | TSAN | | % | 0.3 | 0.3 | 0.3 | 0.3 | 0.3 | 0.3 |
| | Additives | | | 0.25 | 0.25 | 0.25 | 0.25 | 0.25 | 0.25 |
| MVR | | 300° C., 1.2 kg, 5' | cm$^3$/10 min | 7.3 | 8.0 | 8.2 | 6.7 | 7.4 | 7.7 |
| 3 mm INI | Impact | 23° C. | kJ/m$^2$ | 72 | 67 | 61 | 74 | 68 | 62 |
| | Impact | −30° C. | kJ/m$^2$ | 49 | 60 | 56 | 57 | 62 | 60 |
| | Ductility | 23° C. | % | 100 | 100 | 100 | 100 | 100 | 100 |
| | Ductility | −30° C. | % | 60 | 100 | 100 | 100 | 100 | 100 |
| UL94 V0 | FOT | 1.5 mm | sec | 20 | 159 | 489 | 28 | 43 | 133 |
| | pFTP (V0) | 1.5 mm | — | 0.98 | 0.00 | 0.00 | 0.84 | 0.32 | 0.00 |
| CTI Test | number of drops | 250 V | — | — | 70 | 100 | 22 | 30 | 100 |

The results show that titanium dioxide does not adversely affect the electrical tracking resistance even when present at levels as high as 10 wt %. Titanium dioxide does adversely affect the impact performance of the polycarbonate formulations (Examples 2, and 3 that have 5 wt % and 10 wt % titanium dioxide and exhibit loss of room temperature compared with example 1 that does not contain titanium dioxide). The addition of polysiloxane polycarbonate copolycarbonate (in the table identified as EXL) improves the low temperature ductility (Example 3 with 10 wt % titanium dioxide is not ductile at room temperature or at −30° C. with impact value of less than 10 kJ/m² of but Example 6 with 10 wt % titanium dioxide and 7.5 wt % EXL is ductile both at room temperature and at −30° C. with impact values of greater than 50 kJ/m²). Increasing amounts of EXL decreases the electrical tracking resistance and at high loadings of EXL the electrical tracking resistance value falls below the 50 drop passing value in the CTI Test (Example 10, 17.5 wt % EXL falls below the 50 drops value in the CTI Test). The presence of titanium dioxide in the formulations at high EXL loadings improves the electrical tracking resistance (Example 12, 17.5 wt % EXL and 10 wt % titanium dioxide passes the 50 drops in the CTI Test).

Several different types of titanium dioxide were compared. They are listed below:

C. Further balancing of the formulations might provide greater low temperature impact for Types 4 and 5.

1B. Influence of Flame Retardant Additives

Data Table 2 below illustrates that titanium dioxide can be used at a variety of levels to achieve electrical tracking resistance in combination with a flame retardancy and low temperature impact. In these experiments the titanium dioxide used was $TiO_2$ Type 2 (KRONOS 2233), which is another type of titanium dioxide having a siloxane coating.

DATA TABLE 2

|  |  |  |  | 13 | 14 | 15 | 16 | 17 |
|---|---|---|---|---|---|---|---|---|
|  | PC 1 |  | % | 35.92 | 33.42 | 30.92 | 28.42 | 23.42 |
|  | PC 2 |  | % | 35.92 | 33.42 | 30.92 | 28.42 | 23.42 |
|  | EXL |  | % | 12.5 | 12.5 | 12.5 | 12.5 | 12.5 |
|  | TiO2 type 2 |  | % | 5 | 10 | 15 | 20 | 30 |
|  | Br-PC |  | % | 10 | 10 | 10 | 10 | 10 |
|  | TSAN |  | % | 0.3 | 0.3 | 0.3 | 0.3 | 0.3 |
|  | Additives |  | % | 0.36 | 0.36 | 0.36 | 0.36 | 0.36 |
|  | carbon black |  | % |  |  |  |  |  |
| 3 mm INI | 23° C. | Impact | kJ/m² | 72 | 66 | 59 | 54 | 42 |
|  | −30° C. | Impact | kJ/m² | 62 | 53 | 49 | 44 | 32 |
|  | 23° C. | Ductility | % | 100 | 100 | 100 | 100 | 100 |
|  | −30° C. | Ductility | % | 100 | 100 | 100 | 100 | 60 |
| UL94 V0 | 1.5 mm | FOT | sec | 14 | 19 | 14 | 16 | 14 |
|  | 1.5 mm | pFTP (V0) | — | 1.00 | 1.00 | 1.00 | 1.00 | 1.00 |
| CTI Test | 250 V |  | drops | 100 | 100 | 100 | 100 | 100 |

|  | Description | Average Particle Size | Supplier | Grade Name |
|---|---|---|---|---|
| $TiO_2$ Type 1 | Titanium dioxide, (organic coating) | >100 nm | Kronos | Kronos 2450 |
| $TiO_2$ Type 2 | Titanium dioxide (organic coating) | >100 nm | Kronos | Kronos 2233 |
| TiO2 Type 3 | Titanium Dioxide (organic coating) | >100 nm | Millenium/Crystal | Tiona RL-91 |
| $TiO_2$ Type 4 | Titanium dioxide (organic coating) | <50 nm | Sachtleben | UV-Titan P580 |
| $TiO_2$ Type 5 | Titanium dioxide (no organic coating) | >350 nm | DuPont | TiPure R960 |

The formulations included 36.075 wt % PC 1, 36.075 wt % of PC 2, 7.5 wt % of EXL, 10 wt % Brominated PC and 10 wt % of the $TiO_2$ Type 1 (KRONOS 2450). All formulations from the 5 $TiO_2$ types showed excellent CTI test performance passing with at least 60 drops. Formulations from Types 1, 2 and 3 all showed at least 80% ductility and about 50 or great kJ/m2 impact at −30° C. Formulations from Types 4 and 5 however showed the worse low temperature than Types 1, 2 and 3 with 0% ductility and less than 30 kJ/m² impact at −30°

Examples 13-17 illustrate that low temperature impact and electrical tracking resistance can be achieved for formulations that contain from 5-20% titanium dioxide in combination with a polysiloxane block co-polycarbonate and a brominated polycarbonate flame retardant. Examples 13-16 exhibit more than 50 drop performance and pass the CTI test with 100% ductility and with an impact of 40 kJ/m² or greater at −30° C. Furthermore molded parts from these formulations exhibit outstanding flame retardant properties having UL 94 VO p(FTP) values of 1.00 predicting a very high probability of a UL 94 V0 rating at 1.5 mm Example 17 with 30% titanium dioxide illustrates that while excellent electrical tracking resistance (greater than 50 drop in the CTI test) and excellent flame retardant properties (pFTP value of 1.00) are retained the low temperature impact deteriorates significantly compared with Examples 13-16 (only 60% ductility and impact of 32 kJ/m²).

1C. Influence of Fluorinated Polyolefin

The electrical tracking resistance and impact performance of formulations having 5 wt % titanium dioxide, $TiO_2$ Type 1 (KRONOS 2450) and Type 2 (KRONOS 2233) in combination with polysiloxane block co-polycarbonate and fluorinated polyolefin was also evaluated. The results are listed in Data Table 3.

DATA TABLE 3

|  |  |  |  | 18 | 19 | 20 | 21 | 22 |
|---|---|---|---|---|---|---|---|---|
|  | PC 1 |  | % | 40.925 | 40.775 | 35.92 | 31.07 | 35.92 |
|  | PC 2 |  | % | 40.925 | 40.775 | 35.92 | 31.07 | 35.92 |
|  | EXL |  | % | 12.5 | 12.5 | 12.5 | 12.5 | 12.5 |
|  | TiO2 type 1 |  | % | 5 | 5 |  |  |  |
|  | TiO2 type 2 |  | % |  |  | 5 | 5 | 5 |
|  | Br-PC |  | % |  |  | 10 | 20 | 10 |
|  | TSAN |  | % |  | 0.3 | 0.3 |  |  |
|  | PTFE |  | % |  |  |  |  | 0.3 |
|  | Additives |  | % | 0.65 | 0.65 | 0.36 | 0.36 | 0.36 |
| 3 mm INI | Impact | 23° C. | kJ/m² | 63 | 65 | 71 | 70 | 64 |
|  | Impact | −30° C. | kJ/m² | 54 | 52 | 60 | 57 | 41 |
|  | Ductility | 23° C. | % | 100 | 100 | 100 | 100 | 100 |
|  | Ductility | −30° C. | % | 100 | 100 | 100 | 100 | 0 |
| UL94 V0 | FOT 5 bars | 1.5 mm | sec | 275 | 360 | 29 | 17 | 21 |
|  | pFTP (V0) | 1.5 mm | — | 0.00 | 0.00 | 0.52 | 1.00 | 0.94 |
| CTI Test |  | 250 V | drops | 96 | 100 | 100 | 100 | 91 |

The results from examples 19 and 20 illustrate that the presence of a SAN encapsulated fluorinated polyolefin (T-SAN) does not significantly affect the electrical tracking resistance or ductility of formulations containing 5 wt % titanium dioxide and 12.5 wt % polysiloxane block co-polycarbonate. Example 18 (without T-SAN) and example 19 (with T-San) showed nearly identical results in the CTI Test and with 100% ductility and with greater than 50 kJ/m2 impact values.

The CTI testing results for two different types of fluorinated polyolefins were also compared. Examples 20 was formulated using SAN encapsulated fluorinated polyolefin (TSAN) in earlier section this is called TSAN, used consistent naming while Example 22 used a fluorinated polyolefin that did not have SAN encapsulation. Both Examples showed excellent electrical tracking resistance indicating that tracking resistance did not depend on the type of fluorinated polyolefin chosen. The low temperature ductility of the TSAN examples was better than the fluorinated polyolefin however. The UL 94 V0 UL 94 V0 p(FTP) values for the non-encapsulated fluorinated polyolefin was better (Example 22, UL 94 V0 p(FTP)=0.94) than the encapsulated polyolefin (Example 20, UL 94 V0 p(FTP)=0.52). The results in this and other Tables suggest that careful balancing of titanium dioxide, polysiloxane block co-polycarbonate and the brominated flame retardant with the non-encapsulated fluorinated polyolefin may provide a formulation that passes the CTI Test and impact and flame performance.

1D. Influence of Additives.

The influence of polycarbonate additives on the electrical tracking resistance and low temperature impact was also evaluated. The results are shown in Data Table 4.

DATA TABLE 4

|  |  |  |  | 23 | 24 |
|---|---|---|---|---|---|
|  | PC 1 |  | % | 36.075 | 36.25 |
|  | PC 2 |  | % | 36.075 | 36.25 |
|  | EXL |  | % | 7.5 | 7.5 |
|  | TiO2 type 2 |  | % | 10 | 10 |
|  | Br-PC |  | % | 10 | 10 |
|  | Additives |  | % | 0.35 |  |
| 3 mm INI | Impact | 23° C. | kJ/m² | 66 | 67 |
|  | Impact | −30° C. | kJ/m² | 55 | 56 |
|  | Ductility | 23° C. | % | 100 | 100 |
|  | Ductility | −30° C. | % | 100 | 100 |
| CTI Test |  | 250 V | drops | 100 | 100 |

The additives included a mold release and a thermal stabilizer. Comparing two formulations one with the polycarbonate additives (Example 23) and one without the polycarbonate additives (Example 24) showed no difference in electrical tracking resistance (greater than 50 drops in the CTI Test) or low temperature impact (100% ductility and greater than 60 kJ/m2 impact).

2. Electrical Tracking Resistance/FR

2A. Halogenated Organic Flame Retardant Additive Types.

Data Tables 5 and 6 summarize experiments comparing different types of brominated and chlorinated organic flame retardant additives.

DATA TABLE 5

|  |  |  |  | 25 | 26 | 27 | 28 | 29 | 30 | 31 |
|---|---|---|---|---|---|---|---|---|---|---|
| 9105 | PC 1 |  | % | 40.77 | 40.62 | 40.72 | 40.27 | 38.77 | 35.77 | 30.77 |
| 9175 | PC 2 |  | % | 40.77 | 40.62 | 40.72 | 40.27 | 38.77 | 35.77 | 30.77 |
| 661 | EXL |  | % | 12.5 | 12.5 | 12.5 | 12.5 | 12.5 | 12.5 | 12.5 |
| 080 | TiO2 type 1 |  | % | 5 | 5 | 5 | 5 | 5 | 5 | 5 |
| 0895 | TiO2 type 2 |  | % |  |  |  |  |  |  |  |
| 411 | KSS |  | % |  | 0.3 |  |  |  |  |  |
| 4455 | Rimar |  | % |  |  | 0.1 |  |  |  |  |
| 422 | Br-PC (~26% Br) |  | % |  |  |  | 1 | 4 | 10 | 20 |
| BC52 | Br-oligomer (~52%Br) |  | % |  |  |  |  |  |  |  |
| 4223 | Br-Acrylate (~72% Br) |  | % |  |  |  |  |  |  |  |
| E383128 | Br-Epoxy 1 (~50% Br) |  | % |  |  |  |  |  |  |  |
| E383130 | Br-Epoxy 2 (~50% Br) |  | % |  |  |  |  |  |  |  |
| E383131 | Br-Epoxy 3 (~60% Br) |  | % |  |  |  |  |  |  |  |
| E383132 | Br-Epoxy 4 (~56% Br) |  | % |  |  |  |  |  |  |  |

DATA TABLE 5-continued

| | | | | | | | | | |
|---|---|---|---|---|---|---|---|---|---|
| E383133 | Br-Epoxy 5 (~52% Br) | % | | | | | | | |
| E381780 | Br-phthalimide (67% Br) | % | | | | | | | |
| 139 | Chlorinated phthalocyanide | | | | | | | | |
| 271 | PMHS | % | | | | | | | |
| 449 | TSAN | % | 0.3 | 0.3 | 0.3 | 0.3 | 0.3 | 0.3 | 0.3 |
| | Additives | % | 0.66 | 0.66 | 0.66 | 0.66 | 0.66 | 0.66 | 0.66 |
| | wt-% Br | % | | | | 0.3 | 1.0 | 2.6 | 5.2 |
| 3 mm INI | Impact 23° C. | kJ/m² | 64 | | 63 | 67 | 62 | 62 | 61 |
| | Impact −30° C. | kJ/m² | 53 | | 54 | 53 | 48 | 44 | 20 |
| | Ductility 23° C. | % | 100 | | 100 | 100 | 100 | 100 | 100 |
| | Ductility −30° C. | % | 100 | | 100 | 100 | 100 | 80 | 0 |
| UL94 V0 | FOT 5 bars 1.5 mm | sec | 293 | 51 | 185 | 117 | 109 | 28 | 11 |
| | pFTP (V0) 1.5 mm | — | | 0.00 | 0.11 | 0.00 | 0.00 | 0.01 | 0.57 | 1.00 |
| UL94 V0 | FOT 5 bars 0.8 mm | sec | | | | | | | |
| | pFTP (V0) 0.8 mm | — | | | | | | | |
| CTI Test | 250 V | drops | 59 | 27 | 15 | 98 | 84 | 100 | 100 |

| | | | 32 | 33 | 34 | 35 | 36 | 37 |
|---|---|---|---|---|---|---|---|---|
| 9105 | PC 1 | % | 20.77 | 35.925 | 35.775 | 35.875 | 38.425 | 38.925 |
| 9175 | PC 2 | % | 20.77 | 35.925 | 35.775 | 35.875 | 38.425 | 38.925 |
| 661 | EXL | % | 12.5 | 12.5 | 12.5 | 12.5 | 12.5 | 12.5 |
| 080 | TiO2 type 1 | % | 5 | | | | | |
| 0895 | TiO2 type 2 | % | | 5 | 5 | 5 | 5 | 5 |
| 411 | KSS | % | | | 0.3 | | | |
| 4455 | Rimar | % | | | | 0.1 | | |
| 422 | Br-PC (~26% Br) | % | 40 | 10 | 10 | 10 | | |
| BC52 | Br-oligomer (~52%Br) | % | | | | | 5 | |
| 4223 | Br-Acrylate (~72% Br) | % | | | | | | 4 |
| E383128 | Br-Epoxy 1 (~50% Br) | % | | | | | | |
| E383130 | Br-Epoxy 2 (~50% Br) | % | | | | | | |
| E383131 | Br-Epoxy 3 (~60% Br) | % | | | | | | |
| E383132 | Br-Epoxy 4 (~56% Br) | % | | | | | | |
| E383133 | Br-Epoxy 5 (~52% Br) | % | | | | | | |
| E381780 | Br-phthalimide (67% Br) | % | | | | | | |
| 139 | Chlorinated phthalocyanide | | | | | | | |
| 271 | PMHS | % | | | | | | |
| 449 | TSAN | % | 0.3 | 0.3 | 0.3 | 0.3 | 0.3 | 0.3 |
| | Additives | % | 0.66 | 0.35 | 0.35 | 0.35 | 0.35 | 0.35 |
| | wt-% Br | % | 10.4 | 2.6 | 2.6 | 2.6 | 2.6 | 2.9 |
| 3 mm INI | Impact 23° C. | kJ/m² | 51 | 72 | 73 | 72 | 66 | 71 |
| | Impact −30° C. | kJ/m² | 13 | 62 | 53 | 53 | 55 | 62 |
| | Ductility 23° C. | % | 100 | 100 | 100 | 100 | 100 | 100 |
| | Ductility −30° C. | % | 0 | 100 | 100 | 100 | 100 | 100 |
| UL94 V0 | FOT 5 bars 1.5 mm | sec | 11 | 14 | 14 | 15 | 12 | 18 |
| | pFTP (V0) 1.5 mm | — | 1.00 | 1.00 | 1.00 | 1.00 | 1.00 | 0.98 |
| UL94 V0 | FOT 5 bars 0.8 mm | sec | | 35 | 16 | 33 | | 22 |
| | pFTP (V0) 0.8 mm | — | | 0.71 | 1.00 | 0.86 | | 0.97 |
| CTI Test | 250 V | drops | 15 | 100 | 80 | 46 | 100 | 100 |

DATA TABLE 6

| | | 38 | 39 | 40 | 41 | 42 | 43 |
|---|---|---|---|---|---|---|---|
| PC 1 | % | 38.325 | 38.325 | 38.775 | 38.625 | 38.425 | 38.975 |
| PC 2 | % | 38.325 | 38.325 | 38.775 | 38.625 | 38.425 | 40.675 |
| EXL | % | 12.5 | 12.5 | 12.5 | 12.5 | 12.5 | 12.5 |
| TiO2 type 1 | % | | | | | | |
| TiO2 type 2 | % | 5 | 5 | 5 | 5 | 5 | 5 |
| KSS | % | | | | | | |
| Rimar | % | | | | | | |
| Br-PC (~26% Br) | % | | | | | | |
| Br-oligomer (~52% Br) | % | | | | | | |
| Br-Acrylate (~72% Br) | % | | | | | | |
| Br-Epoxy 1 (~50% Br) | % | 5.2 | | | | | |
| Br-Epoxy 2 (~50% Br) | % | | 5.2 | | | | |
| Br-Epoxy 3 (~60% Br) | % | | | 4.3 | | | |
| Br-Epoxy 4 (~56% Br) | % | | | | 4.6 | | |
| Br-Epoxy 5 (~52% Br) | % | | | | | 5 | |
| Br-phthalimide (67% Br) | % | | | | | | 3.9 |
| TSAN | % | 0.3 | 0.3 | 0.3 | 0.3 | 0.3 | 0.3 |
| Additives | % | 0.35 | 0.35 | 0.35 | 0.35 | 0.35 | 0.35 |
| wt-% Br | % | 2.6 | 2.6 | 2.6 | 2.6 | 2.6 | 2.6 |
| 3 mm INI Impact 23° C. | kJ/m² | | | | | | |
| Impact −30° C. | kJ/m² | | | | | | |
| Ductility 23° C. | % | | | | | | |
| Ductility −30° C. | % | | | | | | |

DATA TABLE 6-continued

| | | | | 38 | 39 | 40 | 41 | 42 | 43 |
|---|---|---|---|---|---|---|---|---|---|
| 4 mm INI | Impact | 23° C. | kJ/m² | 86 | 86 | 84 | 85 | 87 | 72 |
| | Impact | −30° C. | kJ/m² | 22 | 25 | 40 | 30 | 53 | 27 |
| | Ductility | 23° C. | % | 100 | 100 | 100 | 100 | 100 | 100 |
| | Ductility | −30° C. | % | 0 | 0 | 50 | 0 | 90 | 0 |
| UL94 V0 | FOT 5 bars | 1.5 mm | sec | 11 | 13 | 5 | 5 | 7 | 7 |
| | pFTP (V0) | 1.5 mm | — | 1.00 | 0.86 | 1.00 | 1.00 | 1.00 | 1.00 |
| UL94 V0 | FOT 5 bars | 0.8 mm | sec | | | | | | |
| | pFTP (V0) | 0.8 mm | — | | | | | | |
| CTI Test | | 250 V | drops | 100 | 100 | 100 | 100 | 100 | 100 |

Details regarding the types of brominated flame retardant additives used in Data Table 5 and Data Table 6 are listed in the Table below.

| chemical name | wt-% Br | MW | CAS# | supplier | tradename |
|---|---|---|---|---|---|
| TBBPA-BPA copolymer | 26% | Mw = 23600 | 156042-31-8 | SABIC IP | PC105B |
| TBBPA oligomer (pentamer) | 52% | oligomer | 94334-64-2 | Chemtura | BC52 |
| Poly(pentabromobenzylacrylate) | 72% | oligomer | 59447-57-3 | ICL Industrial | FR-1025 |
| Brominated Epoxy | 49-51% | 1,000 | 68928-70-1 | ICL Industrial | F-2001 |
| Brominated Epoxy Oligomer | 50% | 1,600 | 68928-70-1 | ICL Industrial | F-2016 |
| End-capped Brominated Epoxy | 60% | 1,400 | 158725-44-1 | ICL Industrial | F-3014 |
| End-capped Brominated Epoxy | 56% | 2,000 | 135229-48-0 | ICL Industrial | F-3020 |
| Brominated Epoxy Polymer | 52-54% | 15,000 | 135229-48-0 | ICL Industrial | F-3100 |
| 1,2-bis(tetrabromophthalimido)ethane | 67% | 951 | 32588-76-4 | ALbemarle | Saytex BT-93 |

In Examples 28-32 the amount of a brominated polycarbonate was increased from 1 wt % to 40 wt % (from 0.26 wt % to 10.4 wt % bromine atoms). As the brominated polycarbonate increased the flame performance also improved from an UL 94 V0 p(FTP) value of 0 at 1 wt % to a UL 94 V0 p(FTP) value of 1.00 at 20 wt % and 40 wt %. The electrical tracking resistance significantly dropped however at 40 wt % (Example 32 failed the CTI test at only 15 drops).

As shown in Data Table 5 and 6 many other types of brominated flame-retardants were also found to pass CTI and flame testing. They included a brominated polycarbonate oligomer and a brominated polyacrylate (Examples 36 and 37), brominated epoxies (Examples 38-42) and a brominated phthalimide (Example 43). The electrical resistance testing and flame testing of the brominated flame retardants described in the formulations above suggest that a wide variety of brominated flame retardants could be employed to produce formulations that possess both flame performance and good electrical tracking resistance. Furthermore the results also suggest careful balancing of the amount of brominated flame retardant used with other elements in the formulation including the type and amount of titanium dioxide, and polysiloxane block co-polycarbonate content could provide formulations that possess desirable electrical tracking resistance, flame retardancy at 1.5 mm or less and low temperature impact performance.

2B. Flame Retardant Salt Additives.

The results in Data Table 5 above suggest that flame retardant salt additives such as potassium perfluorobutane sulfonate (Rimar salt) and potassium diphenylsulfone-3-sulfonate (KSS) have a negative effect on electrical tracking resistance performance. Examples 26 and 27 using Rimar and KSS flame retardants respectively have failing CTI Test results at 27 and 15 drops. Example 35 suggests however that both desirable electrical tracking resistance and flame retardance might be achieved by using combinations of brominated flame retardants with flame retardant salts.

2C. Thin Wall Flame Performance

The results in Data Table 5 also show that thin wall flame V0 performance may be achieved even at 0.8 mm part thickness in addition to 1.5 mm part thickness while maintaining electric tracking resistance performance. Examples 33 and 34 and 37 illustrate that a brominated polycarbonate and a brominated polycarbonate in combination with KSS or a brominates acrylate flame retardant have V0 UL 94 V0 p(FTP) values of at least 0.70 at 0.8 mm thickness and UL 94 V0 p(FTP) values around 1.00 at 1.5 mm thickness while passing the CTI Test. These samples also showed excellent low temperature impact resistance having 100% ductility and greater than 50 kJ/m2 impact at −30 C.

2D. Influence of Polysiloxane Block Co-Polycarbonate Type.

Data Table 7 below illustrates the influence of polysiloxane block co-polycarbonate type on the flame retardant and electrical tracking resistance properties of polycarbonate formulations.

DATA TABLE 7

| | | | | 44 | 45 |
|---|---|---|---|---|---|
| | PC 1 | | % | 35.77 | 21.34 |
| | PC 2 | | % | 35.77 | 21.34 |
| | EXL | | % | 12.5 | |
| | Clear EXL | | % | | 41.66 |
| | TiO2 type 2 | | % | 5 | 5 |
| | Br-PC | | % | 10 | 10 |
| | TSAN | | % | 0.3 | 0.3 |
| | Additives | | % | 0.36 | 0.36 |
| | % Si | | % | 2.5 | 2.5 |
| 3 mm INI | Impact | 23° C. | kJ/m² | 72 | 62 |
| | Impact | −30° C. | kJ/m² | 62 | 24 |
| | Ductility | 23° C. | % | 100 | 100 |
| | Ductility | −30° C. | % | 100 | 0 |
| UL94 V0 | FOT 5 bars | 1.5 mm | sec | 14 | 12 |
| | pFTP (V0) | 1.5 mm | — | 1.00 | 1.00 |
| CTI | | 250 V | Drops | 100 | 100 |

The polysiloxane block co-polycarbonate labeled "EXL" in the table above is a 20 wt % siloxane containing co-polycarbonate made using interfacial polymerization conditions. The polysiloxane block co-polycarbonate labeled "Clear EXL" is about a 6 wt % siloxane containing co-polycarbonate made using interfacial polymerization conditions. Examples 44 and 45 in the Data Table 7 above contain about the same amount of siloxane in the formulations (about 2.5 wt %) based on the total weight of the formulation. Both polysiloxane block co-polycarbonate types produce excellent flame performance at 1.5 mm thickness with UL 94 VO p(FTP) values of 1.00 and also both pass the CTI Test. The "EXL" polysiloxane block co-polycarbonate seems to provide better impact performance but further optimization of the "Clear EXL" formulation might be expected to provide improvements in impact performance 3. Electrical Tracking Resistance/Impact/FR 3A. Balance of Composition Elements in the Formulation The formulation elements described in Sections 2 and 3 of the Examples Section above that produced polycarbonate compositions having electrical tracking resistance and low temperature impact or electrical tracking resistance and FR performance can be combined to produce polycarbonate compositions having the combination of electrical tracking resistance, FR performance and low temperature impact. Some of these combinations are described in the Data Table 8 below:

improved by the presence of titanium dioxide as illustrated by Examples 46 and 48. The amount of Brominated PC is important for FR performance and at low levels (for example 2 wt %) as in Example 48 low UL 94 VO p(FTP) values can result (UL 94 VO p(FTP)=0.00) even when titanium dioxide is present. Increasing the amount of polysiloxane polycarbonate in the formulation helps the flame performance (Example 47) but hurts the electrical tracking resistance as stated above. The amount of titanium dioxide if increased to 30% can hurt the low temperature impact performance even when the electrical tracking resistance and flame performance are achieved as illustrated in Example 53.

While many possible combinations of titanium dioxide, brominated organic flame retardant, polysiloxane block co-polycarbonate can be employed to meet the desired combinations of electrical tracking resistance, low temperature impact and FR performance, one of the preferred ranges that is suggested from the Data Tables is:

Titanium Dioxide: 5-25 wt %

Polycarbonate Polysiloxane Copolymer: 10-20 wt %

Brominated Polycarbonate: 2-20 wt % (0.5 wt %-5.2 wt % Bromine atoms)

DATA TABLE 8

| | | | | 46 | 47 | 48 | 49 | 50 | 51 | 52 | 53 |
|---|---|---|---|---|---|---|---|---|---|---|---|
| | PC 1 | | % | 29.52 | 38.52 | 33.52 | 35.92 | 33.42 | 30.92 | 28.42 | 23.42 |
| | PC 2 | | % | 29.52 | 38.52 | 33.52 | 35.92 | 33.42 | 30.92 | 28.42 | 23.42 |
| | EXL | | % | 10 | 20 | 20 | 12.5 | 12.5 | 12.5 | 12.5 | 12.5 |
| | TiO2 type 2 | | % | 10 | | 10 | 5 | 10 | 15 | 20 | 30 |
| | Br-PC | | % | 20 | 2 | 2 | 10 | 10 | 10 | 10 | 10 |
| | TSAN | | % | 0.3 | 0.3 | 0.3 | 0.3 | 0.3 | 0.3 | 0.3 | 0.3 |
| | Additives | | % | 0.66 | 0.66 | 0.66 | 0.36 | 0.36 | 0.36 | 0.36 | 0.36 |
| | carbon black | | % | | | | | | | | |
| 3 mm INI | 23° C. | Impact | kJ/m$^2$ | 67 | 84 | 69 | 72 | 66 | 59 | 54 | 42 |
| | −30° C. | Impact | kJ/m$^2$ | 41 | 75 | 64 | 62 | 53 | 49 | 44 | 32 |
| | 23° C. | Ductility | % | 100 | 100 | 100 | 100 | 100 | 100 | 100 | 100 |
| | −30° C. | Ductility | % | 80 | 100 | 100 | 100 | 100 | 100 | 100 | 60 |
| UL94 V0 | 1.5 mm | FOT | sec | 11 | 22 | 113 | 14 | 19 | 14 | 16 | 14 |
| | 1.5 mm | pFTP (V0) | — | 1.00 | 1.00 | 0.00 | 1.00 | 1.00 | 1.00 | 1.00 | 1.00 |
| CTI Test | 250 V | | drops | 100 | 29 | 100 | 100 | 100 | 100 | 100 | 100 |

The polysiloxane block co-polycarbonate in the formulation labeled as EXL in Data Table 8 above provides low temperature impact to the compositions but can reduce the electrical tracking resistance of the formulations as illustrated by Examples 47. The electrical tracking resistance can be 3B. Carbon Black Data Table 9 below illustrates that carbon black may also be present in some of the formulations that possess the desirable balance of electrical tracking resistance, low temperature impact and FR performance

DATA TABLE 9

| | | | | 54 | 55 | 56 | 57 |
|---|---|---|---|---|---|---|---|
| | PC 1 | | % | 38.27 | 33.145 | 31.895 | 30.645 |
| | PC 2 | | % | 38.27 | 33.145 | 31.895 | 30.645 |
| | EXL | | % | 10 | 15 | 17.5 | 20 |
| | TiO2 type 2 | | % | 10 | 7.5 | 7.5 | 7.5 |
| | Br-PC | | % | 2 | 10 | 10 | 10 |
| | TSAN | | | 0.3 | 0.3 | 0.3 | 0.3 |
| | Additives | | % | 0.66 | 0.66 | 0.66 | 0.66 |
| | Carbon Black | | | 0.5 | 0.25 | 0.25 | 0.25 |
| | | | | 5 | 7 | 8 | 9 |
| 3 mm INI | Impact | 23° C. | kJ/m$^2$ | 72 | 68 | 67 | 69 |
| | Impact | −30° C. | kJ/m$^2$ | 50 | 50 | 52 | 53 |
| | Ductility | 23° C. | % | 100 | 100 | 100 | 100 |
| | Ductility | −30° C. | % | 100 | 100 | 100 | 100 |
| UL94 V0 | FOT 5 bars | 1.5 mm | sec | 18 | 24 | 22 | 22 |
| | pFTP (V0) | 1.5 mm | — | 0.98 | 0.85 | 0.98 | 0.95 |
| CTI Test | | 250 V | Drops | 100 | 100 | 100 | 100 |

The results for Examples 54-57 in the Table above show that at levels of 0.25 and 0.5 wt % in formulations within one of the preferred ranges of titanium dioxide, brominated polycarbonate and polysiloxane block co-polycarbonate as described in section 3A above, carbon black (in these examples a conductive carbon black was used) does not adversely affect the balance of electrical tracking resistance (100 drops in the CTI Test), low temperature ductility (100% ductililty with impact of at least 50 kJ/m2 at −30 C) and flame retardance (at least a V0 UL 94 VO p(FTP)=0.85 at 1.5 mm thickness).

3C. Thin Wall FR Performance.

Data Table 10 below shows that brominated organic flame retardants and even combinations of brominated organic flame retardants and salt flame retardants can provide thin wall FR performance at 1.5 mm and 0.8 mm thicknesses while retaining the desired electrical tracking resistance and low temperature impact performance of polycarbonate compositions.

DATA TABLE 10

|  |  |  |  | 58 | 59 | 60 |
|---|---|---|---|---|---|---|
|  | PC 1 |  | % | 35.925 | 35.775 | 38.925 |
|  | PC 2 |  | % | 35.925 | 35.775 | 38.925 |
|  | EXL |  | % | 12.5 | 12.5 | 12.5 |
|  | TiO2 type 2 |  | % | 5 | 5 | 5 |
|  | KSS |  | % |  | 0.3 |  |
|  | Br-PC (~26% Br) |  | % | 10 | 10 |  |
|  | Br-Acrylate (~72% Br) |  | % |  |  | 4 |
|  | TSAN |  | % | 0.3 | 0.3 | 0.3 |
|  | Additives |  | % | 0.35 | 0.35 | 0.35 |
|  | wt-% Br |  | % | 2.6 | 2.6 | 2.9 |
| 3 mm INI | Impact | 23° C. | kJ/m² | 72 | 73 | 71 |
|  | Impact | −30° C. | kJ/m² | 62 | 53 | 62 |
|  | Ductility | 23° C. | % | 100 | 100 | 100 |
|  | Ductility | −30° C. | % | 100 | 100 | 100 |
| UL94 V0 | FOT 5 bars | 1.5 mm | sec | 14 | 14 | 18 |
|  | pFTP (V0) | 1.5 mm | — | 1.00 | 1.00 | 0.98 |
| UL94 V0 | FOT 5 bars | 0.8 mm | sec | 35 | 16 | 22 |
|  | pFTP (V0) | 0.8 mm | — | 0.71 | 1.00 | 0.97 |
| CTI Test |  | 250 V | drops | 100 | 80 | 100 |

Examples 58-60 provide electrical tracking resistance (at least 80 drops in the CTI Test) and low temperature impact resistance (100% ductility and impact values of at least 50 kJ/m² at −30 C) and thin wall FR performance (UL 94 VO) p(FTP) values 1.00 at 1.5 mm thickness and at least 0.70 at 0.8 mm part thickness.

We claim:

1. A composition comprising, based on the total weight of the composition: a polycarbonate that is not a polysiloxane block-co-polycarbonate; 7.5 to 25 wt % of a polysiloxane block co-polycarbonate; 5 to 15 wt % of a transition metal oxide comprising at least one of chromium dioxide and titanium dioxide; optionally a brominated organic flame retardant effective to provide 2 to 6 wt % of bromine atoms; optionally 0.1 to 0.5 wt % of a fluorinated polyolefin; optionally an additive that imparts a desired performance property; and optionally a carbon black containing material, wherein the polysiloxane block co-polycarbonate is derived from Bisphenol-A or a dihydroxy aromatic compound, and a polysiloxane bisphenol having the structure 3:

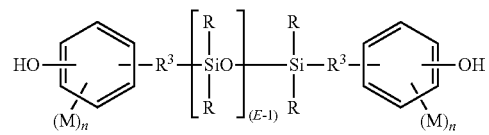

wherein each R is independently a $C_1$-$C_{30}$ aliphatic or an aromatic group or a combination of said aliphatic or said aromatic groups, each $R^3$ is independently a divalent $C_{2-8}$ aliphatic group, M is the same or different, and is a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4 and wherein E has an average value of 20 to 100 and wherein the composition has a notched izod impact at −30° C. of at least 35 kJ/m² at a thickness of 3.0 mm according to ISO-180 standard with a 5.5 J hammer and further wherein the composition does not show tracking through at least 50 drops of a 0.1% aqueous ammonium chloride at 250V according to ASTM D-3638.

2. The composition of claim 1, wherein the polycarbonate is derived from a bisphenol comprising Bisphenol-A.

3. The composition of claim 1, wherein the average value of E of the structure 1 is 20 to 60.

4. The composition of claim 1, wherein the average value of E of the structure 1 is 30 to 50.

5. The composition of claim 1, wherein the transition metal oxide is a titanium dioxide and optionally wherein the titanium dioxide has an average particle size is greater than 50 nm and less than 350 nm.

6. The composition of claim 5, wherein the titanium dioxide is an inorganic coated titanium dioxide without an organic coating.

7. The composition of claim 5, wherein the titanium dioxide is an organic coated titanium dioxide with an organic coating.

8. The composition of claim 7, wherein the organic coating is a polysiloxane coating.

9. The composition of claim 1, wherein the transitional metal oxide is chromium dioxide.

10. The composition of claim 1, wherein said transitional metal oxide is titanium dioxide with an average particle size of greater than or equal to 100 nm and less than 350 nm.

11. The composition of claim 1, wherein the polysiloxane block co-polycarbonate is derived from Bisphenol-A or a dihydroxy aromatic compound, and a polysiloxane bisphenol having the structure

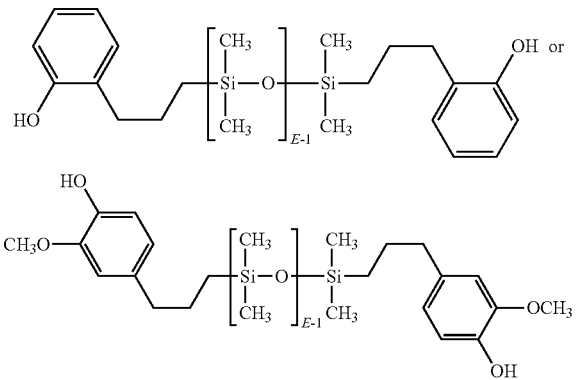

wherein E has an average value of 35 to 55.

12. The composition of claim 5, wherein the polysiloxane block co-polycarbonate is derived from Bisphenol-A or a dihydroxy aromatic compound, and a polysiloxane bisphenol having the structure

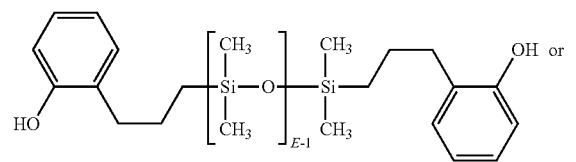

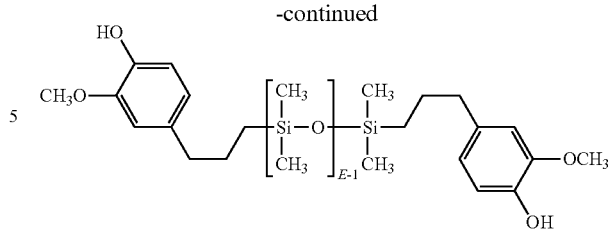

wherein E has an average value of 35 to 55.

13. The composition of claim 1, wherein the wt % of the carbon black in the composition is less than 1 wt % based on the total weight of the composition.

14. The composition of claim 1, wherein the wt % of the carbon black in the composition is less than 0.5 wt % based on the total weight of the composition.

15. An article of manufacture comprising the composition of claim 1.

16. An insulating material comprising the composition of claim 1.

17. The article of claim 15, wherein said article is selected from at least one of the following: a solar apparatus, an electrical junction box, an electrical connector, an electrical vehicle charger, an outdoor electrical enclosure, a smart meter enclosure, a smart grid power node, a photovoltaic frame and a miniature circuit breaker.

18. A junction box housing comprising the composition of claim 1.

19. A method of controlling the tracking of an electrical current of an article of manufacture containing a polycarbonate containing material, the method comprising: providing a composition of claim 1; and processing said composition to form an article of manufacture.

20. The method of claim 19, wherein said article is selected from at least one of the following: a solar apparatus, an electrical junction box, an electrical connector, an electrical vehicle charger, an outdoor electrical enclosure, a smart meter enclosure, a smart grid power node, a photovoltaic frame and a miniature circuit breaker.

* * * * *